(12) United States Patent
Becker et al.

(10) Patent No.: US 8,802,782 B2
(45) Date of Patent: Aug. 12, 2014

(54) MODIFIED POLYOLEFINS WITH AN EXCEPTIONAL PROFILE OF PROPERTIES, PROCESS FOR PREPARATION THEREOF AND USE THEREOF

(75) Inventors: Hinnerk Gordon Becker, Essen (DE); Lutz Mindach, Bochum (DE); Holger Kautz, Haltern am See (DE); Miriam Ammer, Recklinghausen (DE)

(73) Assignee: Evonik Degussa GmbH, Essen (DE)

( * ) Notice: Subject to any disclaimer, the term of this patent is extended or adjusted under 35 U.S.C. 154(b) by 809 days.

(21) Appl. No.: 12/830,889

(22) Filed: Jul. 6, 2010

(65) Prior Publication Data

US 2011/0003095 A1     Jan. 6, 2011

(30) Foreign Application Priority Data

Jul. 3, 2009 (DE) .......................... 10 2009 027 447

(51) Int. Cl.
| | | |
|---|---|---|
| *C08F 255/04* | (2006.01) | |
| *C08F 255/10* | (2006.01) | |
| *C09J 151/06* | (2006.01) | |
| *C09D 151/06* | (2006.01) | |
| *C08L 51/06* | (2006.01) | |
| *C08F 255/02* | (2006.01) | |
| *C09J 123/20* | (2006.01) | |
| *C09J 123/14* | (2006.01) | |
| *C08F 210/06* | (2006.01) | |

(52) U.S. Cl.
CPC ............. *C09J 123/14* (2013.01); *C08F 210/06* (2013.01); *C08F 255/02* (2013.01); *C08L 2207/12* (2013.01); *C09J 123/20* (2013.01); *C09J 151/06* (2013.01); *C08L 2314/06* (2013.01)
USPC ........... 525/242; 525/279; 525/288; 525/293; 525/297; 525/298

(58) Field of Classification Search
CPC .... C08F 255/02; C08F 255/04; C08F 255/10; C08L 51/06; C09J 151/06; C09D 151/06
USPC ......... 525/242, 279, 282, 288, 298, 301, 302; 526/348, 348.6, 351
See application file for complete search history.

(56) References Cited

U.S. PATENT DOCUMENTS

| | | | |
|---|---|---|---|
| 5,994,474 A | 11/1999 | Wey et al. | |
| 7,014,886 B2 | 3/2006 | Vey et al. | |
| 2005/0203255 A1* | 9/2005 | Hanna et al. ................ | 525/333.7 |
| 2005/0245710 A1 | 11/2005 | Kanamaru et al. | |
| 2006/0020067 A1 | 1/2006 | Brant et al. | |
| 2008/0194765 A1 | 8/2008 | Becker et al. | |
| 2008/0213515 A1 | 9/2008 | Vey et al. | |
| 2008/0214757 A1 | 9/2008 | Becker et al. | |
| 2008/0220193 A1 | 9/2008 | Tohi et al. | |
| 2010/0285246 A1* | 11/2010 | Becker et al. ................... | 428/17 |

FOREIGN PATENT DOCUMENTS

| | | | |
|---|---|---|---|
| DE | 10 2008 005 945 A1 | | 7/2009 |
| EP | 1 477 498 A1 | | 11/2004 |
| EP | 1 900 758 A1 | | 3/2008 |
| WO | WO-2006069205 A1 | * | 6/2006 |
| WO | WO-2009/092748 A2 | * | 7/2009 |

OTHER PUBLICATIONS

European Search Report issued Mar. 16, 2011, in Patent Application No. 10166986.9 (with Translation of Category of Cited Documents).
Creanova, "Klebrohstoff für Hot-Melt Anwendungen—Vestoplast", Announcement Degussa-Hüls, XP 2176337, Aug. 1, 1996, pp. 1-35.
U.S. Appl. No. 12/746,091, filed Jun. 3, 2010, Becker, et al.
U.S. Appl. No. 12/863,716, filed Jul. 20, 2010, Becker, et al.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/992,792, filed Nov. 15, 2010, Becker, et al.
U.S. Appl. No. 12/990,955, filed Nov. 4, 2010, Becker, et al.

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

Modified polyolefins with syndiotactic structural elements and a processes for preparation thereof are provided. The modified polyolefins are useful as an adhesive or as a constituent of adhesives.

23 Claims, No Drawings

MODIFIED POLYOLEFINS WITH AN EXCEPTIONAL PROFILE OF PROPERTIES, PROCESS FOR PREPARATION THEREOF AND USE THEREOF

BACKGROUND OF THE INVENTION

1. Field of the Invention

The present invention relates to modified polyolefins with an exceptional profile of properties, the preparation of which is based on semicrystalline polyolefins with syndiotactic structural elements, to a process for preparation thereof and to the use thereof, especially as an adhesive or as a constituent of adhesives.

2. Description of the Related Art

Amorphous poly-alpha-olefins serve in many cases as adhesive raw materials for a wide range of applications. The field of use extends from the hygiene sector through laminations and packaging adhesives as far as construction adhesives and uses in wood processing. Unmodified amorphous poly-alpha-olefins (known as APAOs) are notable for purely physical curing, which is reversible as desired owing to the thermoplastic character thereof. However, they have only limited tensile strengths and adhesive shear strengths, and a relatively low thermal stability. Moreover, they cannot be used to achieve covalent incorporation of reactive surface groups (for example —OH) into an adhesive bond.

The described disadvantages of unmodified APAOs can be remedied by a subsequent functionalization (modification), for which carboxylic acids or carboxylic acid derivatives and/or silanes in particular can be used for modification.

The preparation of silane-modified polyolefins by reaction of polyethylene with unsaturated silanes has been known for sometime. EP 0004034 gives an early description of a method for crosslinking poly($\alpha$-olefins) with the aid of silane bonds, the intention being to achieve maximum degrees of crosslinking. The crosslinking directly follows the grafting and leads to stiff, high-strength materials with low embrittlement temperature, as used, for example, for the production of cable sheathing and/or mouldings. The polymers described cannot be used as adhesives.

DE 1963571, DE 2353783 and DE 2406844 describe processes for crosslinking polyethylene polymers or ethylene copolymers which contain small amounts of propene and/or 1-butene. The target products are crosslinked mouldings based on polyethylene.

DE 2554525 and DE 2642927 describe processes for producing extruded products, including the silane functionalization of a polymer, the incorporation of a silanol condensation catalyst, and the shaping and crosslinking of the polymer, in one operation, by using an extruder. The end applications mentioned are cables, pipes and hoses. Adhesive bonds are not possible with the polymers produced in this way, and further processing overall is possible only to a very limited degree owing to the crosslinking performed immediately after the modification.

It has likewise been known for sometime that it is possible to improve the adhesion of polyolefins to functional surfaces, for example glass, by the introduction of silane groups. For instance, U.S. Pat. No. 3,075,948 gives an early description of graft polymers consisting of unsaturated silane monomers and solid poly(alpha-olefins) having 2-6 carbon atoms, which are said to have improved heat resistance and good adhesion to glass. The resulting modified polymers are used for the production of mouldings and containers, and as a coating for glass vessels; they are not suitable for use as melt-applied adhesives owing to the completely different profile of requirements (melt viscosity, material stiffness in the uncrosslinked state, etc.).

The use of amorphous poly(alpha-olefins) for silane crosslinking is also already known. For example, EP 0260103 describes amorphous silane-modified polymers with a saturated carbon skeleton and low molecular weight, which are used as coating materials for protection from weathering influences. Examples of such polymers include copolymers of ethylene and/or $\alpha$-olefins, especially EPM and EPDM. The base polymers described are amorphous and rubber-like, and have a high elasticity. Owing to their rubber-like character, proccessability in the uncrosslinked state is poor. The products are unsuitable for the intended applications in the adhesives and sealants sector in the present application.

DE 4000695 describes the use of substantially amorphous poly(alpha-olefins) in a process in which the APAOs are reacted with a free-radical donor and optionally additionally graftable monomers (e.g. vinylsilanes) under simultaneous shear stress. The resulting products are suitable for use as carpet coating materials or as melt-applied adhesives. The substantially amorphous polyolefins used to prepare the modified poly(alpha-olefins), however, themselves (i.e. in the unmodified state) have only poor to moderate material or adhesive properties, such that the modified polymers are also suitable only for applications with low requirements. More particularly, the unmodified, predominantly amorphous polyolefins have a high polydispersity, which leads to disadvantages in material cohesion, and to problems with outgassing low molecular weight constituents. The microstructure of the polymer chains is also not very well-defined, one reason being the heterogeneous polymerization catalysts used to prepare the unmodified polyolefins, and so controlled adjustment to particular material or adhesive requirements is possible only with difficulty. An additional factor is that the modified polymers possess only low functionalization, since the ratio of graft polymerization to chain cleavage is unfavourable. Owing to the low functionalization, the crosslinking reaction proceeds slowly; attachment to reactive surfaces is only relatively weak. An additional factor is that the tensile strength both of the uncrosslinked and of the crosslinked modified polyolefin reaches only relatively low values, as a result of which the products remain excluded from many areas of application.

In JP 2003-002930A, graft polymers are prepared from amorphous poly($\alpha$-olefin)s, unsaturated carboxylic acids and optionally additionally unsaturated aromatic substances (e.g. styrene). The polyolefins used are amorphous and do not have a crystallinity of >1 J/g in DSC measurements. Moisture-crosslinking monomer systems, for example vinylsilanes, are not discussed; the grafted polyolefins do not have the desired material parameters owing to the properties of the base polymer thereof and the graft monomers used; more particularly, they are too soft, have only a low heat resistance and exhibit too low a tensile strength.

WO 03/070786 describes a process for preparing modified poly(1-butene) polymers, the modified poly(1-butene) polymers obtainable therefrom, and an adhesive composition comprising the modified poly(1-butene) polymers. The poly (1-butene) base polymer used for the modification has a melting point in the range from 0 to 100° C., an isotacticity index of <20% and a polydispersity of <4.0. The graft monomers mentioned are unsaturated carboxylic acids, carboxylic anhydrides, or corresponding derivatives such as amides, esters, etc.

Moisture-crosslinking monomers, for example vinylsilanes, are not described. The modified polymers prepared are relatively soft and of relatively waxy nature owing to their low crystallinity. The low melting point causes poor heat resistance of the adhesive bonds. The polymers are unsuitable for the applications intended in the present application.

WO 2006/069205 describes modified polyolefins based on low-viscosity polypropylene polymers with a propylene content of >50 mol % and a proportion of isotactic propylene triads of >85%, which can be prepared, among other methods, by a free-radical graft polymerization. Owing to the material properties of the base polymers used, the products obtained are unsuitable for the fields of use intended in the present application.

WO 2007/067243 describes polypropylene polymers functionalized by carboxylic acids and having a high to very high propylene content (75-90 mol %), which are prepared on the basis of propylene-based homo- and/or copolymers with a weight-average molar mass of <100 000 g/mol, a melting point of <157° C. and a melt viscosity at 190° C. of <40 000 cPs at reaction temperatures of 130-165° C. Moisture-crosslinking systems, for example based on silanes, are not described. Owing to the base polymers used and the graft monomers used, the products described are unsuitable for the fields of use intended in the present application.

WO 91/06580 describes silane-modified unsaturated amorphous polymers which can be used in the crosslinked state, for example as mouldings. Further use examples of the silane-modified polymers include adhesive compositions, including melt-applied adhesives. Examples of unsaturated base polymers include rubber-like polymers, for example styrene-butadiene block copolymers (SBS), styrene-isoprene block copolymers (SIS), styrene-butadiene rubber (SBR), nitrile rubber, polychloroprene rubber and butyl rubber. All base polymers mentioned have rubber elasticity (i.e. also poor proccessability) and/or other adverse material properties (for example poor heat resistances), which make them unsuitable for melt-applied adhesive applications.

The use of silane-modified polymers in hotmelt adhesives is likewise known. For example, WO 89/11513 describes an adhesive composition which contains at least one silane-modified or silane-grafted semicrystalline polymer. The base polymers mentioned are especially homo-, co- and terpolymers of $C_{2-6}$-$\alpha$-olefins, and also isotactic polypropylene polymers and blends of polypropylenes, especially when they also contain atactic polypropylene. The graft reaction proceeds at temperatures of 140 to 250° C. Atactic polypropylene without defined polymer microstructure intrinsically has a very low softening point [see, for example: H.-G. Elias; Makromoleküle [Macromolecules]; Vol. III; Wiley-VCH: Weinheim; 2001]. The procedure described in WO 89/11513 leads to products with unsatisfactory material properties, especially with regard to cohesion, adhesion (adhesive shear strength) and heat resistance in the uncrosslinked state (for example immediately after application). The adjustment of the viscosity, melting behaviour and tack of the adhesive composition is attributed causally to the use of relatively long-chain silane monomers (≥3 connecting atoms between silicon atom and the polymer chain), which are said to lead to a "more open structure". The use of relatively long-chain silane monomers is disadvantageous in that it leads to weaker crosslinking as a result of a higher degree of polymerization of the network chains (i.e. of the monomeric base units between two crosslinking sites), which additionally has an adverse effect on the material properties of the graft polymer.

DE 19516457 describes a crosslinkable adhesive composition consisting of at least 50% by mass of a silane-grafted polyolefin and additionally of a carboxylic acid-grafted polyolefin. The base polymers specified for the grafting are poly (ethylene-co-vinyl acetate), polypropylene, polyethylene, poly(ethylene-co-methacrylate) and poly(ethylene-co-methacrylic acid). Owing to the base polymers used and the graft monomers used, the products described are unsuitable for the desired fields of use.

EP 1508579 describes (silane-)modified crystalline polyolefin waxes with a high propylene content. Owing to their wax-like properties and the resulting poor adhesive properties, the polymers described are unsuitable for the fields of use intended. High functionalization according to the present requirements is not achievable owing to the material properties of the base polymers used.

WO 2007/001694 describes adhesive compositions which contain functionalized polymers (preferably maleic anhydride-grafted propylene polymers). The base polymers used are propylene(co)polymers with high isotactic contents (>75% isotactic triads) and a polydispersity of 1.5 to 40, i.e. predominantly crystalline polymers which possess a very broad molar mass distribution, as normally achievable only in polymers with multimodal distribution.

WO 2007/002177 describes adhesive compositions based on poly(propylene) random copolymers, functionalized polyolefin copolymers which are rich in syndiotactic units, and non-functionalized adhesive resins, the poly(propylene) random copolymers having an enthalpy of fusion of 0.5 to 70 J/g and a proportion of isotactic propylene triads of at least 75% (more preferably >90%), and the functionalized (syndiotactic) polymers used having a content of functional monomer units of at least 0.1% and being present with a proportion of <4% by mass in the adhesive composition. The poly(propylene) random copolymers described have a polydispersity of 1.5 to 40, which indicates a multimodal molar mass distribution and the simultaneous presence of a plurality of catalyst species. Polymers with a very broad molar mass distribution, especially with a molar mass distribution of >5, exhibit a very inhomogeneous distribution of functional groups on the polymer chains in free-radically initiated graft reactions.

WO 2007008765 describes the use of low-viscosity silane-grafted poly(ethylene-co-1-olefin) polymers as an adhesive raw material. The polymers used for modification have an ethylene content of at least 50 mol % of ethylene. The silane-grafted polymers have very low failure temperatures. The use of polyolefins with a high ethylene content inevitably means the presence of long ethylene blocks in the polymer. This in turn leads to poor wetting and adhesive properties on many plastics surfaces, such that very many adhesion problems cannot be solved in an optimal manner. In addition, long polyethylene sequences tend to peroxidic crosslinking (which is exploited industrially in the production of cable sheathing among other applications), as a result of which gel formation is unavoidable.

EP 0827994 describes the use of silane-grafted amorphous poly(alpha-olefins) as a moisture-crosslinking adhesive raw material or adhesive. The base polymers used are atactic polypropylene (aPP), atactic poly(1-butene), or preferably co- or terpolymers formed from $C_4$-$C_{10}$ alpha-olefins (0-95% by mass), propene (5-100% by mass) and ethylene (0-20% by mass). The silane-modified APAO described in the examples has a softening point of 98° C., a needle penetration of 15*0.1 mm and a melt viscosity of 6000 mPa*s. The atactic polyolefins and APAOs used have a relatively low molar mass and a relatively low crystallinity, which leads on modification to products with low flexibility, which possess a low functionality and a low tensile strength, and are therefore unsuitable for many applications.

The use of metallocene compounds as a catalyst in olefin polymerization has likewise been known for some time.

Kaminsky et al. have shown that the cyclopentadienylzirconium dichloride/methylaluminoxane ($Cp_2ZrCl_2$/MAO) catalyst system is very suitable for polymerization (*Adv. Organomet. Chem.* 1980, 18, 99-149). Since this time, the use of metallocene compounds in conjunction with methylaluminoxane (MAO) has become widespread in polymerization reactions. For instance, there is a multitude of publications concerned with metallocene-catalysed olefin polymerization, for example of propene, for example U.S. Pat. No. 6,121,377, EP 584 609, EP 516 018, WO 2000/037514, WO 2001/46274 and US 2004/0110910.

In the polymerization of propene or higher homologues thereof, different relative stereoisomers may be formed. The regularity with which the configurative repeat units follow one another in the main chain of a macromolecule is referred to as tacticity. To determine the tacticity, the monomer units of a polymer chain are considered and the relative configuration of each (pseudo)asymmetric chain atom relative to the preceding atom is determined. Isotacticity refers to the situation where the relative configuration of all (pseudo)asymmetric chain atoms found is always the same, i.e. the chain is formed from only one single configurative repeat unit. Syndiotacticity, in contrast, refers to the situation where the relative configurations of successive (pseudo)asymmetric chain atoms are the opposite of one another, i.e. the chain is formed from two different alternating configurative repeat units. In atactic polymers, finally, the different configurative repeat units are arranged randomly along the chain.

The physical properties of propylene polymers depend primarily on the structure of the macromolecules and hence also on the crystallinity, the molecular weight thereof and the molecular weight distribution, and can be influenced by the polymerization process used and especially the polymerization catalyst used [R. Vieweg, A. Schley, A. Schwarz (eds.); Kunststoff Handbuch [Plastics Handbook]; vol. IV/"Polyolefine" [Polyolefins]; C. Hanser Verlag, Munich 1969].

Polypropylene polymers are thus divided into atactic, isotactic and syndiotactic polymers on the basis of their tacticity. Additional special forms include the so-called hemiisotactic polypropylene polymers and the so-called stereoblock polymers. The latter are usually polymers with isotactic and atactic stereoblocks which behave like thermoplastic elastomers, since a physical crosslinking of the polymer chains takes place, which leads to a connection of different crystalline polymer regions (A. F. Mason, G. W. Coates in: "Macromolecular Engineering"; Wiley-VCH, Weinheim; 2007).

Atactic polypropylene has a low softening point, a low density and a good solubility in organic solvents. Conventional atactic polypropylene (aPP) features a very wide molecular weight distribution, which firstly leads to a broad melting range, and secondly entails high low molecular weight fractions which have a greater or lesser tendency to migrate. aPP has a very low tensile strength of approx. 1 MPa, but on the other hand has a very high elongation at break of up to 2000% (H.-G. Elias; Makromoleküle; vol. III; Wiley-VCH; Weinheim; 2001). Owing to the low softening point, the thermal stability of aPP formulations is correspondingly low, which leads to a significant limitation in the area of use. Purely atactic polypropylene polymers can also be prepared by metallocene catalysis to obtain either very low molecular weight or relatively high molecular weight polymers (L. Resconi in: "Metallocene based Polyolefins"; J. Scheirs, W. Kaminsky (eds.); J. Wiley & Sons; Weinheim; 1999).

Syndiotactic polypropylene is highly transparent and is notable for good thermal stability, the melting temperature being below that of isotactic polypropylene. It has high fracture resistances coupled with moderate elongation at break (A. F. Mason, G. W. Coates in "Macromolecular Engineering"; Wiley-VCH, Weinheim; 2007). A disadvantage is the slow crystallization from the melt which is observed in many cases. Owing to physical loops, the melt viscosity of syndiotactic polypropylene with comparable molar mass is significantly higher than that of isotactic polypropylene, i.e. it is possible to achieve the same melt viscosity with significantly lower molar masses. Syndiotactic and isotactic polypropylene are immiscible from a certain molar mass; corresponding polymer blends tend to phase separation. Polymer blends of syndiotactic polypropylene with other polyolefins exhibit a significantly higher elongation at break than blends comprising isotactic polypropylene (T. Shiomura, N. Uchikawa, T. Asanuma, R. Sugimoto, I. Fujio, S. Kimura, S. Harima, M. Akiyama, M. Kohno, N. Inoue in: "Metallocene based Polyolefins"; J. Scheirs, W. Kaminsky (eds.); J. Wiley & Sons; Weinheim; 1999). Conventional heterogeneous Ziegler-Natta catalysts are incapable of preparing syndiotactic polypropylene.

Isotactic polypropylene features a high melting temperature and good tensile strength. For 100% isotactic polypropylene, the calculated melting temperature is 185° C. and the melting enthalpy is approx. 207 J/g (J. Bicerano; J. M. S.; Rev. Macromol. Chem. Phys.; C38 (1998); 391ff). As a homopolymer, however, it has a relatively low cold stability and a high brittleness, and a poor heatsealability or weldability. The tensile strength (fracture) is approx. 30 MPa, and virtually no elongation at break occurs. Improved material properties can be established by co- or terpolymerization with ethylene and 1-butene, the comonomer content for copolymers with ethylene being typically <8% by mass and, for terpolymers with ethylene and 1-butene, <12% by mass (H.-G. Elias; Makromoleküle; vol. III; Wiley-VCH; Weinheim; 2001). At the same MFR (melt flow rate), isotactic polypropylene which has been prepared by conventional heterogeneous Ziegler-Natta catalysis has a significantly lower intrinsic viscosity than polypropylene which has been prepared by metallocene catalysis. The impact resistance of the metallocene-based polymer is above that of the Ziegler-Natta material within a wide molar mass range. The proportion of xylene-soluble constituents is typically significantly <1% by mass for isotactic poly(propylene) homopolymer which has been obtained by metallocene catalysis; in the case of random copolymers with ethylene, according to the ethylene content, xylene-soluble fractions of not more than 5% by mass are found (W. Spaleck in: "Metallocene based Polyolefins"; J. Scheirs, W. Kaminsky (eds.); J. Wiley & Sons; Weinheim; 1999).

Since the solubility of polypropylene depends both on the molecular weight and on its crystallinity, a corresponding fractionation can be effected by means of dissolution tests [A. Lehtinen; Macromol. Chem. Phys.; 195(1994); 1539ff].

With regard to the solubility of polypropylene polymers in aromatic solvents and/or ethers, there are numerous publications in the scientific literature. For example, it has been found that the proportion of xylene-soluble constituents is typically significantly <1% by mass for isotactic poly(propylene) homopolymer which has been obtained by metallocene catalysis; in the case of random copolymers with ethylene, according to the ethylene content, xylene-soluble fractions of not more than 5% by mass are found (W. Spaleck in: "Metallocene based Polyolefins"; J. Scheirs, W. Kaminsky (eds.); J. Wiley & Sons; Weinheim; 1999).

It has been known for some time that it is possible by means of extraction with ethers to obtain amorphous atactic fractions [J. Boor; "Ziegler-Natta Catalysts and Polymerization"; Academic Press; New York; 1979] and low molecular weight fractions with low crystallinity [G. Natta, I. Pasquon, A. Zambelli, G. Gatti; Makromol. Chem.; 70 (1964); 191ff] from polypropylene polymers. Highly crystalline isotactic polymers, in contrast, have a very low solubility both in aliphatic solvents and in ethers, specifically also at elevated temperature [B. A. Krentsel, Y. V. Kissin, V. I. Kleiner, L. L. Stotskaya; "Polymers and Copolymers of higher 1-Olefins"; p. 19/20; Hanser Publ.; Munich; 1997]. The soluble polymer fractions generally have only a very low crystallinity, if any, and do not exhibit a melting point [Y. V. Kissin; "Isospecific polymerization of olefins"; Springer Verlag; New York; 1985]. Tetrahydrofuran-soluble polypropylene oligomers have very low number-average molar masses of significantly less than 1500 g/mol [H. El Mansouri, N. Yagoubi, D. Scholler, A. Feigenbaum, D. Ferrier; J. Appl. Polym. Sci.; 71 (1999); 371ff].

The different polymer types differ significantly in their material properties. The crystallinity of highly isotactic or syndiotactic polymers is very high owing to their high order. Atactic polymers, in contrast, have a high amorphous content and accordingly a low crystallinity. Polymers with high crystallinity exhibit many material properties which are undesired especially in the field of hotmelt adhesives. For example, a high crystallinity in low molecular weight polymers leads to very rapid crystallization with open times ("open time"=time interval within which the parts to be adhesive bonded can be bonded to one another) of in some cases less than one second. In the case of application (for example in the case of nozzle application by spraying), this leads to blockage of the application equipment used even in the event of very small temperature variations, and hence to very poor process stability. An additional factor is the exceptionally short time interval within which the adhesive bond can be joined after the application. Highly crystalline polymers at room temperature are additionally hard and brittle and have only a very low flexibility, which is likewise undesired in the case of adhesive bonds. An additional factor is that very high amounts of energy are required for the melting of highly crystalline polymers at individual points (at the site of introduction) and over the entire conduit system, which, as well as economic effects, also has adverse effects for proccessability. Furthermore, in the case of highly crystalline polymers, there is spontaneous (immediate) solidification below the melting point (which, in analysis by means of differential calorimetry (DSC), is characterized by a sharp melting peak in the 2nd heating), which makes impossible or greatly complicates the proccessability of such polymers or of the products produced on the basis of such polymers.

The preparation of poly-1-olefins with syndiotactic propylene segments by use of metallocene catalysts is known.

For example, U.S. Pat. No. 5,476,914 describes highly crystalline polypropylene polymers. Owing to their high crystallinity, the polymers described, however, are unsuitable for the fields of use intended in the present application.

EP 351391 describes highly crystalline polypropylene homopolymers which have a polydispersity of >3 and a syndiotacticity index of at least 0.8, and a specific linkage of the syndiotactic triads. The polymers are prepared by means of metallocene catalysts with an unsymmetric ligand structure (for example with dimethylmethylene(cyclopentadienyl)(fluorenyl)$ZrCl_2$). The polymers described have very high crystallinity and are therefore unsuitable for the applications intended in the present application.

EP 0747406B1 addresses the topic, but the cyclopentadienyl radical on the metallocene here must always contain a sterically voluminous substituent (at least of the size of a trimethylsilyl group), which likewise leads to products with high tacticity owing to the greatly limited space in the vicinity of the polymerization site.

EP 351392 describes bridged metallocenes (for example dimethylmethylene(cyclopentadienyl)(fluorenyl)$ZrCl_2$) which are used to prepare highly crystalline, syndiotactic polypropylene polymers. It is explicitly pointed out that the preparation of polymers with atactic units is unfavourable.

EP 354893 describes a process for preparing symmetric, free-flowing polypropylene particles of "particular size" and high density using metallocene catalysts. One metallocene catalyst mentioned is dimethylmethylene(cyclopentadienyl)(fluorenyl)$ZrCl_2$. The polymers prepared in the manner described by slurry polymerization do not have the material properties required of adhesive raw materials.

JP 02173104 describes the preparation of polyolefins with narrow molecular weight distribution based on microparticle-supported metallocene catalysts (for example dimethylmethylene(cyclopentadienyl)(fluorenyl)$ZrCl_2$). As a result of the use of solid support components, the polymerization reaction is performed as a heterogeneous polymerization, the results of which are not comparable to those of a homogeneous reaction regime (according to the present patent application). The described polymers with high density and high crystallinity do not have the material properties required of adhesive raw materials.

For instance, EP 0384264 describes distribution based on microparticle-supported metallocene catalysts (for example dimethylmethylene(cyclopentadienyl)-(fluorenyl)$ZrCl_2$, for the preparation of polypropylene waxes. Owing to their high crystallinity and their hardness, the isotactic crystalline waxes described are unsuitable for the uses intended in the present application.

JP 02300212 describes the preparation of syndiotactic polypropylene polymers with the aid of a metallocene catalyst with unsymmetric ligand structure, for example dimethylmethylene(cyclopentadienyl)(fluorenyl)$ZrCl_2$ in which a preliminary polymerization is effected in an aromatic solvent, and the slurry formed there is utilized for the further polymerization. Adhesive raw material polymers cannot be obtained in this way.

JP 03000709 describes the preparation of syndiotactic polypropylene using metallocene catalysts with an unsymmetric ligand structure, for example dimethylmethylene(cyclopentadienyl)(fluorenyl)$ZrCl_2$, in which the metallocene complex is applied to an inorganic silica support. This affords highly syndiotactic systems with high crystallinity, which are unsuitable for use as an adhesive raw material.

JP 03066710 describes the preparation of syndiotactic polypropylene of high density using metallocene catalysts with an unsymmetric ligand structure. As a result of the use of inorganic supports, the polymerization reaction is performed as a heterogeneous polymerization, the results of which are not comparable to those of a homogeneous reaction regime. The described polymers with high density and high crystallinity do not have the material properties required of adhesive raw materials.

EP 423101 describes the use of isopropylidene(3-methyl-cyclopentadienyl-1-fluorenyl)zirconium dichloride for preparation of polypropylenes with hemiisotactic structure. Explicit reference is made to the necessity of absence of bilateral symmetries in the metallocene molecule. Mixtures of hemiisotactic and syndiotactic or isotactic polyolefins are obtained only by using two different metallocene catalysts.

Ewen et al. have shown that, by propene homopolymerization with isopropylidene(Cp)(Flu)$ZrCl_2$ or the analogous Hf compound with MAO as a cocatalyst, it is possible to obtain syndiotactic polypropylene polymers with high stereospecificity, which contain virtually no atactic components [J. A. Ewen, R. L. Jones, A. Razavi; J. Am. Chem. Soc.; 110(1988); 6255/56].

U.S. Pat. No. 4,892,851 describes metallocene catalysts for preparation of syndiotactic polyolefins, especially of syndiotactic polypropylene, and a process for preparing said polymer using the metallocenes claimed. The examples show that exclusively propylene is used; the establishment of specific polymer properties by the use of comonomers is not described. It is pointed out explicitly that it is unfavourable to prepare all three stereospecific polymer types, and that preference is given to those catalysts which prepare predominantly isotactic and/or syndiotactic polymer. The metallocene catalysts mentioned prepare polymers with a high syndiotacticity index. Polymers with very high stereo specificity are unsuitable for use as adhesive raw materials owing to their material properties, more particularly their inadequate adhesion and their hardness.

DE 3907965 describes a process for preparing syndiotactic polyolefins by means of metallocene catalysis using an aluminoxane cocatalyst, the outstanding features of the polyolefin emphasized being a high molar mass, a narrow molar mass distribution and a very high syndiotacity. The objective mentioned is a syndiotacity of >90%. The polymers described are unsuitable for the use as adhesive raw materials intended in the present application.

EP 433987 describes high molecular weight polypropylene copolymers with high syndiotacity of the polypropylene component for the production of slabs, moulding materials, packaging films and coatings. The metallocenes mentioned include diphenylmethylene(9-fluorenyl)(cyclopentadienyl)ZrCl$_2$ and dimethylmethylene-(cyclopentadienyl)(fluorenyl) ZrCl$_2$. Adhesive raw material polymers are not obtained in the manner described.

EP 480390 describes a process for preparing polyolefins with high tacticity and large molar mass. The examples show that both isotactic and syndiotactic polymers are obtained, the isotacticity indices of which are in the range from 90 to 99%, and the syndiotacticity indices of which are 96%. Polymers with high atactic components and polymers with a specific ratio of syndiotactic to isotactic and atactic structural elements are not described.

U.S. Pat. No. 5,459,117 describes specific metallocene catalysts and the use thereof, particular emphasis being given to the fact that the isotactic and syndiotactic polymers preparable with the metallocene catalysts described are preparable without stereo defects, i.e. have a very high tacticity and hence also crystallinity. An identifying feature mentioned for the isotactic and syndiotactic polyolefins is the insolubility thereof in cold xylene. Polymerization catalysts which prepare either syndiotactic or isotactic polymer without atactic components and/or stereo defects are referred to as particularly desirable.

GB 2310398 and DE 19707034 describe heat-activatable labels with an adhesive layer based on ethylene-1-olefin copolymers, which are prepared by metallocene catalyst. Owing to their high ethylene content, the polymers described are unsuitable for the graft modification described in the present application.

WO 99/20664 describes the preparation of polypropylene homopolymers referred to as "hybrid polymers" using metallocene catalysts. It becomes clear in the examples that the polymers obtained have a very high isotactic polymer content.

WO 2000/037514 describes branched semicrystalline poly (ethylene-co-propylene) copolymers, which are said to be suitable, inter alia, for use in hotmelt adhesives. Polymers which have a high proportion of branches, however, tend to gelate in the course of free-radical graft modification, and they are therefore unsuitable for applications intended in the present application.

Hopf and Kaminsky obtained polymers with a very high syndiotacticity index in the homopolymerization of propene with the diphenylmethylene(2,7-ditertbutylfluorenyl)(cyclopentadienyl)ZrCl$_2$-MAO system. [A. Hopf, W. Kaminsky; Catal. Commun.; 3 (2002), 459-464.]

Elsewhere, Kaminsky et al. obtained highly syndiotactic propene homopolymers in the study of the polymerization behaviour of C$_S$-symmetric zirconocenes using [(p-OMePh)$_2$C-(Cp)(2,7-ditertbutyl-Flu)]ZrCl$_2$ or [Ph$_2$C(Cp)(Flu)]ZrCl$_2$ [Kaminsky, Walther; Hopf, Andreas; Arndt-Rosenau, Michael; Macromolecular Symposia (2003), 301-307.]

Seraidaris et al. describe the homopolymerization of propene and the copolymerization of propene with low proportions of ethylene using metallocenes/borate and metallocene-MAO catalyst systems. In the case of use of [(p-OMePh)$_2$C-(Cp)(2,7-ditertbutyl-Flu)]ZrCl$_2$, purely amorphous products were obtained even at low ethylene contents. [Seraidaris, Tanja; Kaminsky, Walther; Seppaelae, Jukka; Loefgren, Barbro; Macromolecular Chemistry and Physics (2005), 206(13), 1319-1325].

Highly isotactic or syndiotactic polypropylene homo- or copolymers with ethylene and/or higher olefins, as described in the publications cited, are unsuitable for use as a melt-applied adhesive or adhesive raw material.

There was therefore a need for functionalized (semicrystalline) polyolefins with improved material properties, especially in functionalized polyolefins which are prepared on the basis of unfunctionalized polyolefins with a defined polymer structure, which enable a high degree of functionalization with simultaneously low polymer degradation owing to their defined chain structure in the free-radical functionalization. At the same time, the functionalized polyolefins should additionally exhibit high flexibility and high transparency coupled with good cohesive and adhesive properties, without having the disadvantages of highly isotactic or highly syndiotactic polymer systems.

DETAILED DESCRIPTION OF THE INVENTION

This and other objects have been achieved by the present invention, the first embodiment of which provides a modified polyolefin, obtained by functionalization of a unfunctionalized polyolefin which is obtained by polymerizing a monomer composition, comprising:
ethylene in a proportion of not more than 20% by mass;
propylene in a proportion of either 50-98% by mass or not more than 15% by mass; and
1-butene in a proportion of 87-98% by mass or not more than 55% by mass;
wherein
a sum of the proportions is 100% by mass,
a triad distribution for the propylene in the unfunctionalized polyolefin comprises:
32-90% by mass of a syndiotactic triad,
not more than 25% by mass of an isotactic triad, and
not more than 65% by mass of an atactic triad, and/or
a triad distribution for the 1-butene in the unfunctionalized polyolefin comprises:
not more than 96% by mass of a syndiotactic triad, and
not more than 45% by mass of a isotactic triad,
the triad content is determined by $^{13}$C NMR, the sum of isotactic, syndiotactic and atactic triads of propene and 1-butene each add up to 100%, the unfunctionalized polyolefin is obtained by polymerization with a metallocene catalyst, and functionalizing the unfunctionalized polyolefin comprises grafting one or more monomers having one or more functional groups onto the unfunctionalized polyolefin.

In a second embodiment, the invention provides a process for preparing the modified polyolefin, comprising:

contacting the unfunctionalized polyolefin with at least one free-radical initiator and monomers having one or more functional groups, and graft reacting the monomers having one or more functional groups onto the unfunctionalized polyolefin.

In a third embodiment, of the present invention, a composition comprising the modified polyolefin is provided. The composition is one selected from the group consisting of a moulding material, a protective material, an adhesive, a sealant, a floor covering, a marking material, a coating material, a sealing membrane or roof membrane, a primer or a primer formulation, and an adhesion promoter formulation.

In a further embodiment, a hot melt adhesive is provided.

There are generally significant differences between polyolefins prepared on the basis of Ziegler-Natta catalysts (for example supported or unsupported $TiCl_3*AlCl_3$ catalysts) and those prepared on the basis of metallocene catalysts. One effect of this is that the unmodified polyolefins of the invention cannot be obtained by conventional Ziegler-Natta catalysts. The main differences are the molecular and chemical homogeneity of the (co)polymers, which may be significantly less in the case of Ziegler-Natta polyolefins than in the case of metallocene-based polyolefins owing to the heterogeneous catalyst structure ("multi-site" catalysts). More particularly, polydispersities of <3 and the simultaneous random distribution of comonomers (especially of those with high reactivity, for example ethylene) over the polymer chain cannot be achieved by Ziegler-Natta catalysts. As a result, the proportions of low molecular weight species in the case of Ziegler-Natta polyolefins are generally significantly higher than in the case of metallocene polyolefins. Propylene polymers with high syndiotactic contents are additionally not obtainable at all by means of conventional Ziegler-Natta catalysts.

The inventive functionalized polyolefins have the particular advantage that they have good adhesion to most common materials, and also good material cohesion, owing to their defined polymer chain structure, and additionally feature a high flexibility and transparency, the defined polymer chain structure of the inventive polymers, even without taking account of the additional effects caused by the monomers grafted on, brings about especially good surface wetting, and hence good adhesion on a substrate used for adhesive bonding. Owing to the syndiotactic structural elements (e.g. comonomer blocks) present in the inventive unmodified polymer, the chain cleavage (β-scission) which occurs in the case of free-radical polymer modifications may be suppressed, such that a high degree of functionalization may be achieved with simultaneously high molar masses, which leads, for example, to functionalized polyolefins with high reactivity coupled with simultaneously high melt viscosity, or enables even higher functionalization coupled with lower melt viscosity. Especially advantageous may be the use of the inventive functionalized polyolefins in adhesives, especially in melt-applied adhesives, the physical properties of which may be selected by a choice of the advantageous material properties of the inventive functionalized polyolefins.

More particularly, the inventive functionalized polymers may be obtained using the inventive unfunctionalized polymers by processes as described hereinafter in the present invention. The use of the processes according to the invention to prepare the inventive functionalized polymers may be especially preferred and enables simple access to the desired functionalized polymers.

Essential features for the positive properties of the inventive functionalized polyolefins may be the specific microstructure of the polymer chains used for functionalization, the polymer composition thereof and/or the specific (macroscopic) material properties of the base polymer used.

In the unfunctionalized polyolefins used to prepare the inventive functionalized polymers, the triad distribution determined by $^{13}C$ NMR for propene triads (provided that the polymer contains propene triads) has a syndiotactic content of 32-90% by mass. This range includes all values and subvalues therebetween, preferably of 34-88% by mass, more preferably of 36-86% by mass and especially of 38-85% by mass, based on the propene triads.

This composition achieves the effect that both the unfunctionalized polymers and the functionalized polymers prepared therefrom have a high degree of flexibility and transparency, while simultaneously achieving good strength (without the disadvantage of brittleness). Moreover, the unfunctionalized and inventive functionalized polyolefins, even in formulations, possess a high flexibility, especially a high extensibility. In addition, by a restriction in the chain cleavage "(β-scission"=side reaction) which proceeds in parallel to the grafting, high degrees of grafting are achieved in the free-radical functionalization.

Likewise preferably, the triad distribution determined by $^{13}C$ NMR for propene triads in the unfunctionalized polyolefins used to prepare the inventive functionalized polymers (provided that the polymer contains propene triads) has an isotactic content of not more than 25% by mass, preferably of 0-23% by mass, more preferably of 1-20% by mass and especially of 2-18% by mass, based on the propene triads. This achieves the effect that both the unfunctionalized polymers and the inventive functionalized polymers prepared therefrom provide polymers which, according to the (co)polymer composition and polymerization conditions selected, in addition to a high transparency and flexibility, either possess additional (isotactic) crystalline units which lead to improved cohesion and a higher softening point, or, by virtue of the absence of isotactic units, have dominant flexible material properties coupled with extremely high transparency.

In addition, the triad distribution determined by $^{13}C$ NMR for propene triads in the unfunctionalized polyolefins used to prepare the inventive functionalized polymers (provided that the polymer contains propene triads) has an atactic content of not more than 65% by mass, preferably of 1-63% by mass, more preferably of 5-61% by mass and especially of 7-60% by mass, based on the propene triads.

This composition achieves the effect that, according to the (co)polymer composition and polymerization and modification conditions selected, both the unfunctionalized polymers and the inventive functionalized polymers prepared therefrom, coupled with high transparency, in addition to the dominant flexible and cohesive properties, also may possess controllable adhesive properties.

In a particularly preferred embodiment, the unmodified polyolefins used for modification have a triad distribution determined by $^{13}C$ NMR for propene triads (provided that the polymer contains syndiotactic and atactic propene triads) a ratio of syndiotactic to atactic propene triads in the range from 1:0.1 to 1:2, preferably in the range from 1:0.12 to 1:1.75, more preferably in the range from 1:0.14 to 1:1.5 and especially preferably in the range from 1:0.16 to 1:1.35. This achieves the effect that both the unmodified polymers and the modified polymers prepared therefrom, according to the (co) polymer composition and polymerization conditions selected, at high to extremely high transparency, have an optimal balance between the dominant flexible and cohesive material properties and the controllable adhesive material properties, with sufficient base adhesion always being ensured.

Especially preferably, the triad distribution determined by $^{13}$C NMR for 1-butene triads in the unfunctionalized polyolefins used to prepare the inventive functionalized polymers (provided that the polymer contains 1-butene triads) may have a syndiotactic content of not more than 96% by mass, preferably of 0-94% by mass, more preferably of 1-92% by mass and especially of 2-90% by mass, based on the 1-butene triads, further preferred ranges being from 2 to 20% by mass and 75 to 90% by mass. In the case that 0% by mass of syndiotactic 1-butene triads are present, the inventive polymers have >60% by mass of atactic triads. This achieves the effect that, both for the inventive unfunctionalized polymers and the functionalized polymers prepared therefrom, as a result of the similar or else very different tacticities of propene and 1-butene triads according to the (co)polymer composition and polymerization conditions selected, there may be an additional control means for the material properties, which enables optimal adjustment of the inventive polymers to a wide variety of different material requirements.

Especially preferably, the triad distribution determined by $^{13}$C NMR for 1-butene triads (provided that the polymer contains 1-butene triads) has an atactic content of not more than 100% by mass, preferably of 4-99% by mass, more preferably of 6-98% by mass and especially of 8-96% by mass, based on the 1-butene triads, further preferred ranges being from 9 to 35% by mass and from 60 to 95% by mass. This achieves the effect that, both for the unfunctionalized polymers and for the inventive functionalized polymers prepared therefrom, for example in the case of very high syndio- and isotactic contents of the propene segments and hence high softening points, the adhesion of the inventive polymers can be controlled via the 1-butene content, whereas, in the case of high atactic contents of the propene segments coupled with relatively low softening points, base cohesion may be ensured by means of correspondingly low atactic contents of the 1-butene segments.

Additionally preferably, the triad distribution determined by $^{13}$C NMR, in the case of the unfunctionalized polyolefins used to prepare the inventive functionalized polymers, in the case that they are poly(ethylene-co-propylene-co-1-butene) terpolymers, for ethylene contents up to 20% by mass, have a proportion of ethylene triads of <1% by mass, preferably <0.8% by mass, more preferably <0.6% by mass, especially preferably <0.5% by mass, such that the ethylene monomer is thus incorporated in essentially random distribution. This achieves the effect that the ethylene content of the inventive polymers enables very controlled adjustment of the material properties, especially of the softening point and of the needle penetration, because the random distribution results in optimal "disruption" of crystalline monomer units, with a need to use only small amounts of ethylene.

The unfunctionalized polyolefins used to prepare the inventive functionalized polymers may contain preferably not more than 20% by mass, preferably not more than 18% by mass and more preferably not more than 15% by mass of ethylene.

The unfunctionalized polyolefins used to prepare the inventive functionalized polymers may contain preferably either 50-98% by mass or not more than 15% by mass of propylene, particularly preferred ranges being 52-98% by mass, 55-97% by mass and 55-95% by mass, or 0-14% by mass, 1-12% by mass and 2-10% by mass.

The unfunctionalized polyolefins used to prepare the inventive functionalized polymers also preferably may contain either 85-100% by mass or not more than 55% by mass of 1-butene, particularly preferred ranges being 87-98% by mass, 89-97% by mass and 90-96% by mass, or 0-54% by mass, 1-50% by mass, 2-45% by mass, 5-35% by mass and 37-44% by mass. In a preferred embodiment of the present invention, the unfunctionalized polyolefins used to prepare the inventive functionalized polymers may contain 100% by mass of 1-butene.

In a further preferred embodiment of the present invention, the unmodified polymers used in accordance with the invention for modification may be copolymers of ethylene, propylene and/or 1-butene, and are especially a poly(ethylene-co-propylene) copolymer, a poly(ethylene-co-1-butene) copolymer or a poly(propylene-co-1-butene) copolymer.

In the case of poly(ethylene-co-propylene) copolymers, the unmodified polymers used to prepare the inventive modified polyolefins may contain not more than 20% by mass, preferably 1-20% by mass, more preferably 2-19% by mass and especially preferably 3-18% by mass of ethylene. The propylene content may be calculated correspondingly, in order that a total of 100% by mass is present (100% by mass minus ethylene content).

In the case of poly(ethylene-co-1-butene) copolymers, the unmodified polymers used to prepare the inventive modified polyolefins may contain not more than 17% by mass, preferably 1-15% by mass, more preferably 2-13% by mass and especially preferably 3-11% by mass of ethylene. The butene content may be calculated correspondingly, in order that a total of 100% by mass is present (100% by mass minus ethylene content).

In the case of poly(propylene-co-1-butene) copolymers, the unmodified polymers used to prepare the inventive modified polyolefins may contain either not more than 47% by mass, preferably 1-45% by mass, more preferably 2-43% by mass or especially preferably 3-40% by mass, or 85-99% by mass, preferably 87-98% by mass and more preferably 89-97% by mass, of 1-butene. The propylene content is calculated correspondingly, in order that a total of 100% by mass is present (100% by mass minus butene content). In a particular embodiment of the present invention, the copolymers contain two comonomers selected from ethylene, propylene, 1-butene, 3-methyl-1-butene, 3-methyl-1-hexene, 3-methyl-1-heptene, 4-methyl-1-pentene and 6-methyl-1-heptene, where the maximum proportion of the branched 1-olefin in the copolymer is not more than 50% by mass, preferably not more than 40% by mass and more preferably not more than 30% by mass.

For the likewise preferred case of a terpolymer, the unfunctionalized polyolefins used to prepare the inventive functionalized polymers may contain especially ethylene, propylene and 1-butene, with not more than 20% by mass, preferably 1-20% by mass, more preferably 2-18% by mass and especially preferably 3-15% by mass of ethylene, not more than 95% by mass, preferably 40-92% by mass, more preferably 45-90% by mass and especially preferably 50-87% by mass of propylene and not more than 25% by mass, preferably 1-23% by mass, more preferably 2-21% by mass, especially preferably 3-20% by mass of 1-butene.

In a particular embodiment of an inventive terpolymer, it may contain three comonomers selected from ethylene, propylene, 1-butene, 3-methyl-1-butene, 3-methyl-1-hexene, 3-methyl-1-heptene, 4-methyl-1-penten and 6-methyl-1-heptene, the maximum proportion of the branched 1-olefin in the copolymer being not more than 50% by mass, preferably not more than 40% by mass and more preferably not more than 30% by mass.

The inventive unfunctionalized polymers contain preferably no aromatic compounds originating from the polymerization process (i.e. <100 µg/g). Furthermore, they additionally contain essentially no organic halogenated compounds which originate from the polymerization process. It may be likewise preferred that the polymers contain no impurities as a result of suspension oils (separating agents), no residuals of inorganic support materials, more particularly no inorganic oxides and/or alkaline earth metal halides (for example $MgCl_2$), no inorganic or organic boron compounds, no talcites and/or hydrotalcites and/or degradation products thereof, and no contamination by alcohols, more particularly by methanol.

The molar mass distribution of the unfunctionalized polymers used to prepare the inventive functionalized polymers, determined by high-temperature gel permeation chromatography with universal calibration, may be monomodal or bimodal, in which case a narrow molar mass distribution with a polydispersity of <3 is also present in the case of bimodally distributed polymers. The molar mass distribution may be especially preferably monomodal. Polymers with a narrow molar mass distribution are notable for a low variance in the material properties. For example, they may have clearly defined melting and setting behaviour. In the case of a very narrow molar mass distribution of the inventive unfunctionalized polyolefins, defined melting/setting behaviour may also be achieved with bimodally distributed polymers, especially when relatively long open times are required and/or no sharp melting peaks must occur (for example in the case of long joining times or varying application temperature).

In addition, the unfunctionalized polymers used to prepare the inventive functionalized polymers may have a polydispersity, determined by high-temperature gel permeation chromatography with universal calibration, of 1.3-3, preferably of 1.4-2.7. This range may be particularly advantageous, especially for use in the adhesives sector. Crystallization or melting behaviour in polymers, especially in polyolefins, is known to be a function of molar mass, and in the case of linear polyolefins more particularly of chain length. For example, it is known from conventional amorphous polyolefins as currently being used in the field of hot-melt adhesives that a polydispersity of 4-6 (or even higher) leads firstly to a very broad melting range and secondly to retarded physical curing/crystallization. An additional disadvantage of the known systems is that polymers with broad molar mass distribution, owing to the crystallization deficiencies described, frequently also exhibit poor tensile strengths, which is likewise undesired. Generally, a broad molar mass distribution is a sign that not a homogeneous polymer but instead a polymer mixture (or a polymer blend) is present, which is known to lead to restrictions in the material properties.

The weight-average molar mass of the unfunctionalized polymers used to prepare the inventive functionalized polymers, determined by high-temperature gel permeation chromatography with universal calibration, may typically be in the range from 15 000 to 400 000 g/mol, preferably of 17 000 to 200 000 g/mol, more preferably in the range from 20 000 to 100 000 g/mol and especially preferably in the range from 22 000 to 95 000 g/mol. This range may be particularly advantageous for use in free-radical graft processes, since, including chain cleavage (which may be greatly suppressed in the present case), during the graft reaction, polymers with molar masses are obtained, which ensure good base cohesion. The inventive modified polymers thus possess an optimal melt viscosity within the relevant application window, such that there is optimal wetting of the surface to be bonded. The relatively low melt viscosity within the preferred molar mass range also enables penetration into macroscopic and microscopic surface structures.

In addition, the unfunctionalized polymers used to prepare the inventive functionalized polymers are notable in that they have an ALPHA value, determined by high-temperature gel permeation chromatography with universal calibration, in the range from 0.6 to 1.2, preferably in the range from 0.62 to 1.17, more preferably in the range from 0.65 to 1.15 and especially preferably in the range from 0.7 to 1.12. The inventive polymers are thus notable for low branching; more particularly, they preferably do not contain any long-chain branches. Owing to their molecular structure, branched polymers exhibit highly complex rheological behaviour, which leads to poor proccessability in or from the melt, and poor applicability. An additional factor is that highly branched polyolefins (especially those with a high ethylene content) tend to peroxidic crosslinking, which is undesired for obvious reasons in the present case.

Preferably, for the unfunctionalized polymers used to prepare the inventive functionalized polymers, the proportion of low molecular weight constituents with a molecular weight of 500 to 1000 daltons found in the analysis by gel permeation chromatography may be not more than 0.75% by mass, preferably not more than 0.5% by mass, more preferably not more than 0.4% by mass and especially not more than 0.3% by mass. Most preferably, the method described cannot detect any constituents with a molecular weight of 500 to 1000 daltons. This achieves the effect that the inventive polymers do not contain any polymer constituents which tend to migration. Since chain cleavage (β-scission) can also occur (to a minor degree) in the case of free-radical functionalization in the inventive unfunctionalized polyolefins, it is also possible for low molecular weight polymers to form. The total concentration of low molecular weight polymer chains in the functionalized polymers reaches critical values especially when low molecular weight constituents were already present in the unmodified polyolefin used for functionalization.

Additionally preferably, the proportion of low molecular weight constituents with a molecular weight of less than 500 daltons found in the analysis by high-temperature gel permeation chromatography with universal calibration for the unfunctionalized polymers used to prepare the inventive functionalized polymers is not more than 0.75% by mass, preferably not more than 0.5% by mass, more preferably not more than 0.4% by mass, especially not more than 0.3% by mass. Most preferably, the method described cannot detect any constituents with a molecular weight of <500 daltons. Since chain cleavage (β-scission) can also occur (to a small degree) in the case of free-radical functionalization in the inventive unfunctionalized polyolefins, it is also possible for low molecular weight polymer chains to form. The total concentration of low molecular weight polymer chains in the functionalized polymer reaches critical values especially when low molecular weight constituents were already present in the unmodified polyolefin used for functionalization. When low molecular weight compounds with molar masses of <500 daltons are present in the unmodified polyolefins used to prepare the inventive modified polyolefins, there is the risk that gaseous degradation products form to an increased degree in the free-radical functionalization, which greatly complicate the preparation process (for example by foaming).

In a particular, preferred embodiment, the unfunctionalized polyolefins used to prepare the inventive functionalized polyolefins may have a polymer content with a molecular weight of 1000 to 500 daltons determined by ht-GPC with universal calibration of <0.25% by mass, preferably <0.20% by mass, especially preferably <0.1% by mass, while simultaneously the polymer content with a molecular weight less than 500 daltons likewise determined by ht-GPC with universal calibration is <0.25% by mass, preferably <0.20% by mass, especially preferably <0.1% by mass.

In a further particularly preferred embodiment, the unfunctionalized polyolefins used to prepare the inventive functionalized polyolefins have no polymer content with a molecular weight of 1000 to 500 daltons detectable by ht-GPC with universal calibration, while simultaneously no content with a molecular weight of less than 500 daltons can be detected with the ht-GPC method described.

In addition, the unfunctionalized polymers used to prepare the inventive functionalized polymers may be notable in that they have, at a temperature of 190° C., a deformation of not more than 1% and a measurement frequency of 1 Hz, a complex melt viscosity of 700 to 400 000 mPa*s, preferably of 800 to 300 000 mPa*s, more preferably of 900 to 250 000 mPa*s and especially preferably of 1000 to 150 000 mPa*s, further preferred ranges being from 1100 to 25 000 mPa*s, from 26 000 to 65 000 mPa*s and from 66 000 to 140 000 mPa*s. This leads to the effect that the processing of the inventive unfunctionalized polyolefins in a free-radically initiated graft polymerization process can provide functionalized polyolefins with different melt viscosity and/or functionalization adjusted to the particular application range, the limitation at high melt viscosities leading to the effect that optimal mixing of polymer melt, monomers and/or initiators may always be achieved.

The melts of the unfunctionalized polyolefins used for the functionalization may be notable for a certain structural viscosity, which may be particularly favourable especially for processing in melt processes. A measure for the structural viscosity of the inventive unfunctionalized polymers may be the ratio of the melt viscosity measured at 190° C. and a deformation of not more than 1% at a shear rate of 10 Hz and a shear rate of 0.1 Hz. This ratio for the unfunctionalized polymers used to prepare the inventive functionalized polymers is from 1:1 to 1:100, preferably from 1:1.05 to 1:50, more preferably from 1:1.075 to 1:25 and more preferably from 1:1.1 to 1:10.

An important parameter for the preparation of the inventive modified polyolefins in or from the melt may be the temperature-dependent rheological behaviour. This may be obtained, for example, by the measuring of a cooling curve in an oscillation rheometer, in which very low deformation (max. 1%) and a slow cooling rate (1.5 K/min) should be observed. The measurements obtained from the cooling curve are distinctly superior with regard to reproducibility to those obtained from heating curves (especially from curves in the first heating), since the preceding melting firstly levels out the thermal history of the polymer sample, and the measurement body surface is secondly wetted optimally by the melt, which rules out friction and slippage effects between measurement body and sample. An additional factor is that, at the high temperatures at the start of the measurement (i.e. in the melt), the proneness of the polymer sample to deformation (i.e. the risk of an irreversible change in morphology) is significantly lower than in the solid state, such that only in this way may it possible to ensure that the polymer sample remains within the linear viscoelastic range.

A rheological characteristic which may be employed for the optimal processing window may be the ratio of storage modulus and loss modulus in the temperature range from the end of the melting point to approx. 220° C. For trouble-free processing from or in the melt, the loss modulus G" (as a synonym for the viscous material properties) must be significantly above the storage modulus G' (as a synonym for the elastic material properties) within the processing window. The ratio of storage modulus G' to loss modulus G" for the unfunctionalized polymers according to the claims, at a shear rate of 1 Hz and a deformation of 1%, in the temperature range from the end of the highest melting peak (offset/DSC) to approx. 220° C., is in the range from 1:1 to 1:10 000, preferably in the range from 1:1.25 to 1:5000, more preferably in the range from 1:1.5 to 1:2500 and especially preferably in the range from 1:2 to 1:1000.

The needle penetration of the unmodified polymers used for modification is 1-50*0.1 mm, preferably 2-45*0.1 mm, more preferably 3-30*0.1 mm and especially preferably 4-28*0.1 mm, very particular preference being given to value ranges from 5 to 15*0.1 mm and from 16 to 27*0.1 mm. This achieves the effect that the unmodified polymers used in accordance with the invention have an optimal ratio of strength and plasticity, which is particularly advantageous for processing in or from the melt (very good melting behaviour).

The unmodified polymers used in accordance with the invention are predominantly semicrystalline in nature, i.e. have a significant crystalline content. This may be manifested in melting peaks in the first and/or second heating of the polymers in DSC. All inventive unmodified polymers may exhibit at least one melting peak at least in the first melting in the DSC. Irrespective of the number and shape of the melting peaks, the melting peak maxima for the inventive unmodified polyolefins in the measurement by means of a differential calorimeter (DSC) in the 1st heating are in the range from 35 to 145° C. It may be preferred that the measurement in the differential calorimeter (DSC) in the first heating can detect 1-3 melting peaks, in which case, in the case of three melting peaks, the first melting peak maximum is at temperature of 40-60° C., the second at temperatures of 65-110° C. and the third at temperatures of 80-140° C., more preferably at temperatures of 85-130° C. When only two melting peaks occur, the first melting peak maximum is in the range from 40 to 115° C., the second in the range from 50 to 140° C., more preferably in the range from 55 to 135° C. When only one melting peak occurs, the melting peak maximum is in the range from 40 to 140° C. Irrespective of the number and shape of the melting peaks, the melting peak maxima for the unmodified polyolefins (if melting peaks can be detected) in the measurement by means of a differential calorimeter (DSC) in the 2nd heating are in the range from 70 to 150° C., preferably in the range from 75 to 145° C. In the second heating in the differential calorimeter, the unmodified polymers preferably have 0, 1 or 2 melting peaks, in which case, in the case of two melting peaks, the first melting peak maximum is at 80 to 125° C., the second melting peak maximum at 90-140° C., more preferably 95-135° C. When only one melting peak is present, the melting temperature is 80 to 145° C., more preferably 85-142° C. According to the copolymer composition, the polymers have a marked tendency to cold crystallization, in which case (if present) the exothermic cold crystallization peak in the 2nd heating is in the range from 30 to 75° C. When the unmodified polymers in the second melting have no melting peak, this does not mean in any way that they possess no crystallinity. Instead, the crystallinity present is merely not detectable by the DSC standard test method used.

Unlike highly crystalline polyolefins which have a single, very sharp melting peak, the unmodified polymers in the 2nd heating curve of the DSC measurement at a heating rate of 10 K/min more preferably may have either one melting peak or two melting peaks, in which case these melting peaks may have different intensities. When at least one melting peak is detectable in the 2nd heating curve of the DSC, the end of the melting range (known as peak offset) for the unmodified polymers is in the range from 85° C. to 150° C., preferably in the range from 87° C. to 148° C., more preferably in the range from 89° C. to 146° C. and especially preferably in the range from 90° C. to 145° C.

Preferably, the unmodified polymers used for modification have an endothermic enthalpy of fusion measured in the second heating in the DSC of 0 to 35 J/g, preferably of 1-33 J/g, more preferably of 2-30 J/g and especially preferably of 3-28 J/g, very particular preference being given to the ranges of 1-15 J/g and of 16-28 J/g. This achieves the effect that both the unmodified polymers and the modified polymers prepared therefrom have a crystallinity which may be high enough to ensure a high initial strength of a bond (even without the influence of monomers grafted on), but remains sufficiently low that there is very good proccessability even at relatively low temperatures. According to the polymer composition, polymerization conditions selected and manner of the modification performed, it may be possible to provide polymers whose melting requires only a low to moderate energy contribution (compared to highly crystalline polyolefins), which in turn is an advantage for processing in the melt.

The exothermic cold crystallization enthalpy measured in the second heating in the DSC for the unmodified polyolefins used for modification in accordance with the invention may preferably not be more than 20 J/g, preferably 0-18 J/g, more preferably 1-17 J/g. This achieves the effect that it may be possible to provide polymers which, both in the unmodified and in the modified state, allow completely new possibilities in relation to the joining techniques used in bonds. For instance, it may be possible in the case of the inventive polymers, according to the polymer composition, polymerization conditions used and modification present, after the joining and cooling, still to plastically deform the adhesive bond for a certain period and then to cure it by means of storage at elevated temperature (recrystallization). On the other hand, the recrystallization can also be accelerated by heat treatment (i.e. storage at elevated temperature) immediately after the joining.

The glass transition temperature of the unmodified polymers, determined by means of DSC from the 2nd heating curve, may not be more than 0° C., preferably in the range from −2 to −50° C., more preferably in the range from −3 to −45° C., particular preference being given especially to the value ranges from −3 to −25° C. and from −26 to −45° C. This achieves the effect that both the unmodified polymers and the modified polymers prepared therefrom, according to polymer composition, polymerization conditions selected and modification present, can also be used in application sectors which require high low-temperature flexibility, and therefore remain closed to highly crystalline polyolefins (for example isotactic polypropylene). It is especially remarkable that the low glass transition temperatures may be achieved for the inventive unmodified polymers without the use of expensive comonomers, for example 1-pentene, 1-hexene, 1-octene, 1-nonene and/or 1-decene.

In addition, according to the copolymer composition, the softening point of the unmodified polymers used in accordance with the invention for modification, measured by the ring & ball method, may not be more than 160° C., preferably 80-155° C., more preferably 83-145° C. and especially 85 to 140° C. This achieves the effect that both the unmodified polymers and the modified polymers prepared therefrom, when used in adhesive bonds or adhesive formulations, lead to high heat resistances of these adhesive bonds even without taking account of the effects caused by a modification.

In a particular embodiment, the unmodified polymers used to prepare the inventive modified polymers may have no detectable melting peak in the 2nd heating curve of the DSC, but a softening temperature determined by the ring & ball method of at least 80° C., preferably at least 83° C., more preferably of at least 85° C. and especially preferably of 85-160° C. Polymers may thus be provided which require only a very low energy input to achieve melt fluidity, and may therefore also be processed together with thermally sensitive graft monomers at relatively low temperatures.

The unmodified polymers used for modification preferably may have, at room temperature, a solubility in xylene of up to 100% by mass, preferably of 60-100% by mass, more preferably of 70-100% by mass and especially preferably of 80-100% by mass. This has the advantage that polymers may be provided with good to very good solubility in xylene, which, in contrast to systems with this property known to date, have a very narrow molar mass distribution with exceptionally low low molecular weight content, and a high crystallinity in view of the solubility, and a high softening point and a moderate needle penetration. The inventive polymers with high solubility in xylene enable the simple preparation of free-radically modified polymers by solvent-based preparation processes.

The unmodified polymers preferably additionally may have a solubility in tetrahydrofuran (THF) at room temperature of up to 100% by mass, preferably at least 10% by mass, preferentially of at least 25% by mass, more preferably of at least 40% by mass and especially preferably of at least 50% by mass. This has the advantage that nonpolar polymers with moderate to very good solubility can be provided in a polar solvent (for example for graft reactions in solution), which, in contrast to systems with this property known to date, have a very narrow molar mass distribution with exceptionally low low molecular weight contents and a high crystallinity in view of the solubility, and a high softening point and a moderate needle penetration, such that it is possible to provide polymers which, in spite of their solubility in tetrahydrofuran, possess very good material cohesion.

In addition, the unmodified polymers used for modification are notable in that they may have, without further additives, after at least 24 hours of storage time, a tensile strength in the tensile test of 1-25 MPa, preferably of 1.5-23 MPa, more preferably of 2-21 MPa and especially of 2.5 to 20 MPa, and/or an absolute elongation at break of at least 10%, preferably of at least 15%, more preferably of 20-1500% and especially preferably of 25 to 1250%, particular preference likewise being given to the ranges of 50-750%, 100-650% and 150-600%, and the ranges of 50-250%, 250-550% and 500 to 1000%.

The unmodified polyolefins used for modification may be prepared by contacting a metallocene catalyst with at least one first solvent, the at least one first solvent being an nonhalogenated aliphatic solvent, at least one methylaluminoxane component modified by alkyl groups, which may be optionally present dissolved and/or suspended in a second solvent, the second solvent being a nonhalogenated solvent which may be the same as or different from the first solvent, and at least one 1-olefin monomer in a reaction chamber, and then polymerizing the at least one 1-olefin monomer at a reaction temperature to form inventive polyolefins, wherein the reaction temperature is above the boiling temperature of the first solvent(s). It is essential that the reaction temperature in the steady reaction state is above the boiling temperature of the first solvent(s) and preferably simultaneously below the softening point (determined by the ring & ball method) of the polymer prepared in accordance with the invention. More particularly, the polymerization temperature in the steady reaction state is at least 10 K below the softening temperature, preferably at least 15 K, more preferably at least 20 K and especially preferably at least 25 K. The latter may be a particularly outstanding characteristic of the process according to the invention, because there is no formation of macroscopic polymer particles (as present, for instance, in a slurry polymerization) in the polymerization medium in spite of this temperature regime on application of the process according to the invention, and polymerization instead proceeds in a homogeneous phase.

The at least one first solvent may be selected from nonhalogenated cyclic and/or linear aliphatic solvents. The solvent preferably has a boiling temperature at standard pressure of not more than 101° C. The aliphatic solvents preferably have a boiling temperature at standard pressure of not more than 80° C., preferably of not more than 60° C., more preferably of not more than 40° C. and especially preferably of not more than 20° C.

More particularly, the nonhalogenated aliphatic solvents are cyclic and/or linear aliphatic compounds having not more than 7 carbon atoms, preferably having not more than 6 carbon atoms and more preferably having not more than 5 carbon atoms. The nonhalogenated aliphatic solvent may more preferably be selected from the group including propane, butane, pentane, cyclopentane, methylcyclopentane, hexane, cyclohexane, methylcyclohexane, heptane or mixtures thereof. The solvent may most preferably be propane and/or n-butane.

The metallocene catalyst which may be used with preference in the present process may be selected from compounds of the formula I

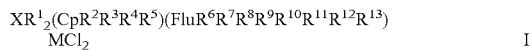

in which M is a transition metal selected from the group comprising Zr, Hf and Ti, preferably Zr, in which Cp is cyclopentadienyl and Flu is fluorenyl, and in which $XR^1_2$ (where X=Si or C) joins the cyclopentadienyl ligands and the fluorenyl ligands as a bridge, where $R^1$ is selected from linear or branched alkyl groups having 1 to 6 carbon atoms, alkoxyalkyl groups having 1 to 6 carbon atoms, aryl groups or alkoxyaryl groups, and where $R^2$ to $R^{13}$ are selected from the group comprising H and/or linear or branched alkyl groups having 1 to 10 carbon atoms.

Preferably, $R^4$, $R^7$ and $R^{12}$ are each linear or branched alkyl groups having 1 to 10 carbon atoms, and $R^2$, $R^3$, $R^5$, $R^6$, $R^8$ to $R^{11}$ and $R^{13}$ are each H. The metallocene compound may preferably be one of the formula II

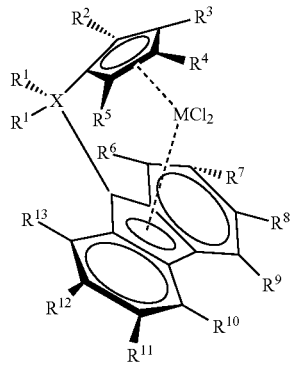

in which $R^1$ to $R^{13}$ are each as defined above.

Linear and branched alkyl groups having 1 to 10 carbon atoms are especially substituents selected from the group including methyl, ethyl, propyl, isopropyl, butyl, tert-butyl, pentyl, hexyl, heptyl, octyl, nonyl or decyl.

Alkoxylalkyl groups having 1 to 6 carbon atoms are especially selected from the group including methoxymethyl, methoxyethyl, methoxypropyl, ethoxymethyl, ethoxyethyl and ethoxypropyl.

Aryl groups are especially selected from the group including benzyl, phenyl and indenyl.

Alkoxyaryl groups are especially selected from the group including methoxyphenyl, Methoxybenzyl, dimethoxyphenyl, ethyoxyphenyl, methoxy-ethoxyphenyl and methoxyindenyl, at least one alkoxy group being in the para position to the bond of the aryl ring to the ligand bridge.

The metallocene compound in the present process according to the invention may most preferably be dimethylmethylene(cyclopentadienyl)(fluorenyl)zirconium dichloride, dimethylmethylene-(3-tertbutylcyclopentadienyl)(fluorenyl)zirconium dichloride, dimethylsilyl(cyclopentadienyl)(fluorenyl)zirconium dichloride, diphenylmethylene(cyclopentadienyl)(fluorenyl)zirconium dichloride, diphenylsilyl(cyclopentadienyl)(fluorenyl)zirconium dichloride or di(paramethoxyphenyl)methylene-(2,7-ditertbutylfluorenyl)(cyclopentadienyl)-zirconium dichloride.

The compounds mentioned may preferably be present in the form of a racemic enantiomer mixture and especially preferably do not contain the enantiomorphic, optically inactive meso form to a significant degree. The proportion of the meso form in the present invention is not greater than 5% by mass, preferably not greater than 2% by mass and especially preferably not greater than 1% by mass.

The catalyst may be supplied to the polymerization chamber preferably together with a high excess of aliphatic hydrocarbon(s), more preferably of the first solvent, particular preference being given to supplying it in homogeneous form, i.e. dissolved completely.

The 1-olefin monomers used in the polymerization may in principle be selected from all 1-olefins known to those skilled in the art. In particular, the at least one 1-olefin monomer may be selected from the group comprising ethylene and linear 1-olefins. Suitable linear 1-olefins are especially propene and/or 1-butene.

The at least one methylaluminoxane component modified by alkyl groups serves in the process according to the invention as a cocatalyst. More particularly, the cocatalyst may be a compound of the formula III for the linear type

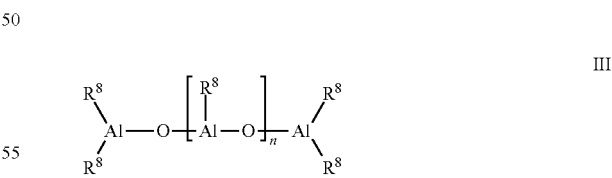

and/or of the formula IV for the cyclic type

where, in the formulae III and IV, $R^8$ is methyl and/or isobutyl and n is an integer of 2 to 50. In particular, 15 to 45 mol % of the R⁸ radicals are isobutyl, preferably 17 to 45 mol %, more preferably 19 to 43 mol % and especially preferably 20 to 40 mol %. Only the proportion of isobutyl radicals enables solubility of the cocatalyst in nonaromatic solvents. The cocatalyst may preferably be present dissolved in a second solvent whose boiling temperature is especially preferably not more than 101° C. The second solvent of the cocatalyst may be especially selected from linear alkanes having 3-7 carbon atoms, preferably having 4-6 carbon atoms, the boiling temperature of the second solvent preferably being significantly below the polymerization temperature, though this is not obligatory. In particular, the second solvent may be propane, n-butane, n-pentane, cyclopentane, methylcyclopentane, n-hexane, cyclohexane, methylcyclohexane and/or n-heptane.

The reaction chamber for performing the preparation process may be a stirred tank, a stirred tank cascade with at least two stirred tanks, a flow tube and/or a flow tube with forced conveying (for example a screw machine). It may be possible for the abovementioned reactors to be used either as an individual solution or in any desired combination.

The molar mass may be regulated via the selected polymerization temperature and/or the metered addition and mixing of gaseous hydrogen into the polymerization mixture; the molar mass is more preferably controlled without the use of gaseous hydrogen only via the selection of the appropriate polymerization temperature. In the case that hydrogen is used to regulate the molar mass, it is preferably metered into the liquid reaction phase, the metered addition being effected via the base of the reaction chamber and/or via a mixing unit used, for example a stirrer.

The polymer obtained is obtained after the polymerization either by precipitation in a precipitant of opposite polarity (for instance water and/or alcohols, for example ethanol, isopropanol or butanol) or by direct degassing with a subsequent melting operation. After the degassing, the polymer prepared may be subjected to a further finishing step, the finishing step being an additivation and/or a pulverization and/or a pelletization and/or a granulation. Direct further processing of the molten polymer may also be possible.

In the inventive functionalized polyolefins, monomers having one or more functional groups have been grafted onto the unfunctionalized base polymers described above. The monomers to be grafted on preferably have olefinic double bonds. More particularly, the monomers having one or more functional groups may be selected from carboxylic acids and/or carboxylic acid derivatives (for example maleic anhydride, maleic acid, itaconic acid, itaconic anhydride, citric anhydride, acrylic acid, methacrylic acid), of the acrylates (for example hydroxymethyl acrylate, hydroxyethyl acrylate, hydroxypropyl acrylate, methyl methacrylate, ethyl methacrylate, butyl methacrylate, glycidyl methacrylate, etc.), of the vinylsilanes (for example vinyltrimethoxysilane, vinyltriethoxysilane, vinyltris(2-methoxyethoxy)silane, 3-methacryloyloxypropyltrimethoxysilane, 3-methacryloyloxypropyltriethoxysilane, vinyldimethylethoxysilane and/or vinylmethyldibutoxysilane, especially vinyltrimethoxysilane), of the vinylaromatics (for example styrene, α-methylstyrene, divinylbenzene, aminostyrene, styrenesulphonic acid, etc.), of the cyclic imido esters and the vinyl compounds thereof (e.g. isopentenyl-2-oxazoline, ricinoloxazoline maleate, etc.), of the vinylimidazolines (e.g. 1-vinylimidazole), of the vinylpyrrolidones (e.g. N-vinylpyrrolidone), and/or of the alicyclic vinyl compounds (for example 4-vinyl-1-cyclohexene, vinylcyclohexane, vinylcyclopentane, etc.).

The modified polymers have particular properties, some of which are attributable to the properties of the base polymers used for modification, some of them to the graft monomers used, and some of them to the process used for modification, or a combination.

With regard to the properties of the inventive modified polyolefins, the influence of the modification on the material properties in particular may be noted. For instance, especially vinylsilanes with alkoxy groups tend to crosslink in the presence of moisture, such that the material properties (for example melt viscosity, needle penetration, softening point, etc.) are altered according to the storage conditions. The properties listed hereinafter should be understood (unless explicitly stated otherwise) as properties of uncrosslinked materials without further additives.

Thus, the melt viscosity of the inventive modified (grafted) polyolefin in the uncrosslinked state, determined by oscillation rheometry at 1 Hz and a deformation of not more than 1% at 190° C., is 500-350 000 mPa*s, preferably 750-300 000 mPa*s, more preferably 1000-250 000 mPa*s and especially preferably 1250-200 000 mPa*s, further preferred ranges being from 1500 to 10 500, 5000 to 18 500, 15 000 to 30 000, 30 000 to 50 000 and from 45 000 to 150 000 mPa*s. The melts of the inventive modified polymers exhibit both viscoelastic and structural viscous behaviour. Therefore, modified polyolefins are provided which, on the basis of their variable melt viscosity in the uncrosslinked state, are suitable for a wide variety of different application methods, and can correspondingly also be used in a wide variety of different fields of application (for example melt-applied adhesives, sealants, moulding materials, primers, etc.). A particular feature of the inventive modified polyolefins is that their structural viscosity (i.e. the dependence of the melt viscosity on the shear rate) in the uncrosslinked state increases with rising molecular weight.

The softening point of the uncrosslinked inventive modified (grafted) polyolefin, measured by the ring & ball method, is 80 to 168° C., preferably 85 to 160° C., more preferably 87 to 155° C., and especially preferably 90 to 150° C., further preferred ranges being from 90 to 105° C., from 100 to 122° C., from 116 to 135° C. and from 128 to 148° C. Therefore, modified polyolefins are provided which, according to the polymer composition and monomers grafted on, have a moderate to high softening point, i.e. on the one hand, even in the uncrosslinked state, lead to sufficient thermal stability of a bond produced using the inventive modified polyolefins, but on the other hand also permit processing (in particular in the melt) at moderate processing and application temperatures, and are therefore also suitable for thermally sensitive applications.

The needle penetration of the uncrosslinked inventive modified polyolefin is from 2 to 45*0.1 mm, preferably from 3 to 40*0.1 mm, more preferably from 4 to 35*0.1 mm and especially preferably from 5 to 32*0.1 mm. Modified polyolefins are thus provided which, in the uncrosslinked state, have a good balance between strength/hardness and flexibility.

The tensile strength of the inventive modified polyolefins is (without further additives) in the uncrosslinked state in the range from 1 to 28 MPa, preferably in the range from 1.5 to 26 MPa, more preferably in the range from 2 to 24 MPa and especially preferably in the range from 2.5 to 22 MPa, further preferred ranges being from 2 to 7.5 MPa, from 5 to 13 MPa, from 7.5 to 15 MPa and from 12 to 20 MPa. This especially ensures high base cohesion in the uncrosslinked state. The elongation at break determined in the tensile test for the inventive modified polyolefins is (without further additives), in the uncrosslinked state, in the range from 10 to 1300%, preferably in the range from 15 to 1200%, more preferably in the range from 20 to 1150% and especially preferably in the range from 20 to 1100%, further preferred ranges being from 25 to 225%, from 200 to 450% and from 400 to 950%. This provides modified polyolefins which possess a high degree of flexibility in the uncrosslinked state.

In a particularly preferred embodiment, the needle penetration of the uncrosslinked inventive modified polyolefin may be not more than 20*0.1 mm, preferably not more than 18*0.1 mm and especially preferably in the range from 2 to 16*0.1 mm, while the softening point may simultaneously be in the range from 80 to 165° C., preferably in the range from 90 to 155° C. and especially preferably in the range from 100 to 145° C., the tensile strength simultaneously being at least 5 MPa, preferably at least 7 MPa, more preferably at least 7.5 MPa and especially preferably in the range from 8 to 25 MPa, the elongation at break simultaneously being at least 100%, preferably at least 150%, more preferably at least 200% and especially preferably in the range from 200 to 780%.

In a particularly preferred embodiment, at least one of the monomers used for modification may be a silicon-containing monomer. The inventive modified polyolefins have, in this case (after complete removal of unreacted residual monomer), a silicon content determined by XRF spectroscopy (X-ray fluorescence spectroscopy) of at least 0.25% by mass, preferably of at least 0.30% by mass, more preferably of at least 0.35% by mass and especially preferably of 0.40-2% by mass, further particularly preferred ranges being from 0.4 to 0.75% by mass, from 0.7 to 0.95% by mass, from 0.8 to 1.25% by mass and from 1.1 to 2% by mass. The inventive modified polymers which have a silicon content of at least 0.25% by mass are notable especially in that they have (without further additives), after a storage time of at least 14 days in a climate-controlled cabinet (20° C./65% relative air humidity), in a pure polypropylene bond (material: untreated isotactic polypropylene), an adhesive shear strength of at least 0.4 N/mm², preferably of at least 0.5 N/mm², more preferably of at least 0.75 N/mm² and especially preferably of at least 1 N/mm². On (highly) syndiotactic polypropylene (without further additives), after a storage time of at least 14 days in a climate-controlled cabinet (20° C./65% relative air humidity), in a pure polypropylene bond, tensile shear strengths of at least 1.75 N/mm² are achieved. In addition, they are notable in that they have (without further additives), in a pure wood bond (wood type: untreated beech), after at least 14 days of storage in a climate-controlled cabinet (20° C./65% relative air humidity), have an adhesive shear strength of at least 1.5 N/mm², preferably of at least 1.75 N/mm², more preferably of at least 2 N/mm² and especially preferably of at least 2.25 N/mm².

In a further particularly preferred embodiment, at least one of the monomers used for modification may be a carboxylic acid or a carboxylic anhydride. In this case, the oxygen content determined by elemental analysis is especially at least 0.1% by mass, preferably at least 0.15% by mass, more preferably at least 0.2% by mass and especially preferably at least 0.25% by mass. These inventive modified polyolefins are notable especially for very good adhesion to metals, especially to aluminium. The inventive modified polymers which have an oxygen content of at least 0.1% by mass are notable especially in that they (without further additives), after a storage time of at least 14 days in a climate-controlled cabinet (20° C./65% relative air humidity), in a pure aluminium bond (material: untreated aluminium, 99.5), have an adhesive shear strength of at least 0.35 N/mm², preferably of at least 0.5 N/mm², more preferably of at least 0.75 N/mm² and especially preferably of at least 0.9 N/mm².

In a further particularly preferred embodiment, at least one of the monomers used for modification may be an acrylate or methacrylate. In this case, the oxygen content determined by elemental analysis is at least 0.15% by mass, preferably at least 0.25% by mass, more preferably at least 0.3% by mass and especially preferably at least 0.35% by mass. These inventive modified polyolefins are notable especially for good adhesion to acrylate-based polymers, for example polymethyl methacrylate, and to untreated polyolefin surfaces. The inventive acrylate-modified polymers which have an oxygen content of at least 0.15% by mass are notable especially in that they (without further additives), after a storage time of at least 14 days in a climate-controlled cabinet (20° C./65% relative air humidity), in a pure PMMA bond ("7N" moulding material, Evonik Röhm GmbH; bonding temperature 200° C.), have an adhesive shear strength of at least 0.35 N/mm², preferably of at least 0.5 N/mm², more preferably of at least 0.75 N/mm² and especially preferably of at least 1.0 N/mm².

In a further particularly preferred embodiment, at least one of the monomers used for modification may be a silane acrylate. In this case, the silicon content determined by XRF spectroscopy (X-ray fluorescence spectroscopy) is at least 0.15% by mass, preferably at least 0.20% by mass, more preferably at least 0.25% by mass and especially preferably 0.30-2% by mass.

These inventive modified polyolefins may be notable especially for a good adhesion to glass, metals, untreated polyolefins and PMMA, and are simultaneously crosslinkable, which leads to very high tensile shear strengths.

Polyolefins with preferred properties mentioned are very particularly suitable for adhesive bonds, especially for use as or in hotmelt adhesives, and exhibit advantageous properties compared to known systems. This may be especially true of the further-improved adhesion to untreated polyolefins, especially to untreated polypropylene and very particularly to syndiotactic polypropylene, and also paper/paperboard, wood, glass, polar polymers, for example polycarbonate, polyethylene terephthalate, etc., and/or metals, especially aluminium.

The present invention further provides processes for preparing an inventive modified polyolefin, wherein at least one semicrystalline polyolefin with an ethylene content, determined by $^{13}C$ NMR spectroscopy, of not more than 20% by mass of ethylene contains 50-98% by mass or not more than 15% by mass of propylene and/or either 85-100% by mass or not more than 55% by mass of 1-butene, where the sum of the proportions is 100% by mass, which has the additional feature that the triad distribution thereof, likewise determined by $^{13}C$ NMR, for propene triads (in the case that the inventive polymers contain propene triads) has a syndiotactic content of 32-90% by mass, an isotactic content of not more than 25% by mass and an atactic content of not more than 65% by mass, and/or the triad distribution for 1-butene triads (in the case that 1-butene is present as a monomer), determined by $^{13}C$ NMR, has a syndiotactic content of not more than 96% by mass and an isotactic content of not more than 45% by mass, where the contents of isotactic, syndiotactic and atactic triads of propene and 1-butene each add up to 100%, the unfunctionalized polymer having been prepared using a metallocene catalyst, and contacted with at least one free-radical initiator and monomers having one or more functional groups, followed by a graft reaction of the monomers having one or more functional groups onto the polyolefin.

The one or more monomers may be grafted onto the base polymer by all prior art methods, for example in solution or preferably in the melt, in which case one or more free-radical donors is/are used in a sufficient amount. A suitable method may be found in DE-A 40 00 695, to which explicit reference is made. For example, the following free-radical donors may be used: diacyl peroxides, for example dilauryl peroxide or didecanoyl peroxide, alkyl peresters, for example tert-butyl peroxy-2-ethylhexanoate, perketals, for example 1,1-di(tert-butylperoxy)-3,3,5-trimethylcyclohexane or 1,1-di(tert-butylperoxy)cyclohexane, dialkyl peroxides, for example tert-butyl cumyl peroxide, di(tert-butyl) peroxide or dicumyl peroxide, carbon free-radical donors, for example 3,4-dimethyl-3,4-diphenylhexane or 2,3-dimethyl-2,3-diphenylbutane, and azo compounds, for example azobisisobutyronitrile, 2,2'-azodi(2-acetoxypropane), etc. The grafting may be effected especially at a temperature of 30 to 250° C.

In a particular embodiment, the process may be a solution process, wherein aliphatic and/or aromatic hydrocarbons and/or cyclic ethers may be used as solvents. Particular preference may be given to using at least one aromatic hydrocarbon as the solvent. Suitable aromatic hydrocarbons are especially trichlorobenzene, dichlorobenzene, toluene and xylene, particular preference being given to using xylene. Particularly preferred aliphatic hydrocarbons are, for example, propane, n-butane, hexane, heptane, cyclohexane and octane. A particularly preferred cyclic ether is tetrahydrofuran (THF).

When ethers, especially cyclic ethers, are used as solvents, the initiator used and the reaction conditions have to be selected with particular care in order to suppress or to control the formation of explosive peroxides of the ethers used. More particularly, the additional use of specific inhibitors (e.g. IONOL) may be considered.

In the case of a grafting process in solution, the concentration of the base polymer used is at least 10% by mass, preferably at least 15% by mass, more preferably at least 20% by mass and especially preferably at least 22.5% by mass, based on the reaction mixture. The reaction temperature of the grafting process in solution may be 30 to 200° C., preferably 40 to 190° C., more preferably 50 to 180° C. and especially preferably 55 to 140° C. The solution grafting may be effected either in a batchwise or continuous manner. In the case of a batchwise reaction regime, the solid polymer (for example in the form of granules, powder, etc.) is first dissolved in the solvent used. Alternatively, a conditioned polymerization solution from the preparation process of the base polymer may be used directly, and brought to reaction temperature. This may be followed by the addition of the monomer/of the monomers and of the free-radical initiator(s). In a particularly preferred embodiment, solvent, base polymer(s) and monomer(s) are initially charged and brought to reaction temperature, while the free-radical initiator(s) is/are metered in continuously over a defined period. This has the advantage that the steady-state free-radical concentration may be low, and therefore the ratio of graft reaction to chain cleavage is particularly favourable (i.e. more graft reaction and less chain cleavage). In a further particularly preferred embodiment, solvent and base polymer(s) are initially charged and brought to reaction temperature, while monomer(s) and free-radical initiator are metered in continuously—together (for example in the form of a mixture) or separately from one another—over a defined period. This has the advantage that both the steady-state free-radical concentration and the monomer concentration at the reaction site are low, which suppresses both chain cleavage and the formation of homopolymers. This is important especially in the case of use of monomers which have a strong tendency to thermally initiated (homo)polymerization at reaction temperature. After the different defined periods of metered addition, very particular preference may be given to metering in a further amount of free-radical initiator(s) in order to minimize the content of residual monomers in the reaction solution. The reactor used may preferably be a stirred tank; the use of alternative reaction vessels, for example batchwise kneading reactors, may likewise possible, and may be preferred especially in the case of low reaction temperatures and/or high polymer concentrations.

In the case of a continuous reaction regime, the solid polymer may be first dissolved in at least one solvent in one or more reservoir vessels (for example stirred tanks), and then metered continuously into the reaction vessel(s). In an alternative, likewise particularly preferred embodiment, a conditioned polymer solution from a preparation process of the base polymer may be used directly. In a further, likewise particularly preferred embodiment, the solid polymer (for example in the form of powder, granules, pellets, etc.) may be metered together with at least one solvent continuously into a (single- or multishaft) screw machine or a Contikneter continuous kneader, dissolved under the action of temperature and/or shear, and then metered continuously into the reaction vessel(s). Useful reaction vessels or reactors for the performance of the continuous graft reaction in solution include continuous stirred tanks, stirred tank cascades, flow tubes, flow tubes with forced conveying (e.g. screw machines), reaction kneaders and any desired combinations thereof. When flow tubes with forced conveying are used, they are preferably extruders, in which case it may be possible to use single-shaft, twin-shaft or multishaft extruders. Particular preference may be given to using twin-shaft and/or multishaft extruders. Especially preferred for continuous preparation of the inventive modified polymers in solution is the use of a reactor combination composed of flow tube, flow tube with forced conveying and continuous stirred tank in any sequence, in which case the removal of residual monomers and volatile by-products/degradation products is preferably also effected either in the flow tube with forced conveying or in the continuous stirred tank.

A preferred alternative may be a melt process wherein at least one free-radical initiator is metered directly into the melt. In particular, in this process variant, the temperature of the polymer material at the time of metered addition of at least one free-radical initiator is above the SADT (Self-accelerating decomposition temperature=temperature above which self-accelerating decomposition can set in) of at least one of the free-radical initiators metered in.

The reaction temperature of the graft process in the melt may be 160-250° C., preferably 165-240° C., more preferably 168 to 235° C. and especially preferably 170 to 230° C.

The melt grafting may be effected either in batchwise or continuous mode. In the case of a batchwise reaction regime, the solid polymer (for example in the form of granules, powder, pellets, etc.) is first melted and optionally homogenized. Alternatively, a conditioned polymer melt from a polymerization process is used directly and brought to reaction temperature. This is followed by the addition of monomer(s) and free-radical initiator(s).

In a particular embodiment, monomer(s) and polymer melt are mixed homogeneously and brought to reaction temperature, while the free-radical initiator(s) is/are metered in continuously over a defined period. This has the advantage that the steady-state free-radical concentration is low, and therefore the ratio of graft reaction to chain cleavage is particularly favourable (i.e. more graft reaction and less chain cleavage).

In a further particularly preferred embodiment, the polymer melt may be initially charged and homogenized, while monomer(s) and free-radical initiator are metered in continuously, together (for example in the form of a mixture) or separately, over a defined period. This has the advantage that both the steady-state free-radical concentration and the monomer concentration at the reaction site remain low, which suppresses both chain cleavage and the formation of homopolymer. The latter is important particularly in the case of use of monomers which tend to thermal (homo) polymerization at the reaction temperature present. The reactor used is preferably a stirred tank with a close-clearance stirrer unit or a reaction kneader.

In the case of a continuous reaction regime, the solid polymer may be first melted in one or more reservoir vessels (for example stirred tanks) and then metered continuously into the reaction vessel(s). In an alternative, likewise particularly preferred embodiment, a conditioned polymer melt from a polymerization process may be used directly. In a further, likewise particularly preferred embodiment, the solid polymer (for example in the form of powder, granules, pellets, etc.) may be metered continuously into a (single-shaft or multishaft) screw machine or a Contikneter continuous kneader, melted under the action of temperature and/or shear, and then metered continuously into the reaction vessel(s). Useful reaction vessels or reactors for the performance of the continuous graft reaction in the melt include continuous stirred tanks, stirred tank cascades, flow tubes, flow tubes with forced conveying (for example screw machines), reaction kneaders, and any combinations thereof. When flow tubes with forced conveying are used, they are preferably extruders, in which case it is possible to use single-shaft, twin-shaft or multishaft extruders. Particular preference is given to using twin-shaft and/or multishaft extruders. Especially preferred for continuous preparation of the inventive modified polymers in the melt may be the use of a reactor combination composed of flow tube, flow tube with forced conveying and continuous stirred tank in any sequence, the removal of residual monomers and volatile by-products/degradation products preferably also being effected either in the flow tube with forced conveying or in the continuous stirred tank.

The present invention further provides for the use of the inventive modified polyolefins in moulding materials, as or in adhesives, in marking materials, coating materials, sealing membranes, floor coverings or roof membranes, as primers or in primer formulations and/or adhesion promoter formulations and/or aqueous dispersions, suspensions and/or emulsions. Corresponding moulding materials, adhesives, marking materials, coating materials, roof membranes, floor coverings or roof membranes, primers or primer formulations, adhesion promoter formulations, aqueous dispersions, suspensions and/or emulsions comprising the inventive polymers likewise form part of the subject-matter of the present invention.

In the case of moulding materials, these comprise the inventive polyolefin and at least one further polymer. In a particularly preferred embodiment, at least one inventive modified polyolefin may be used as a compatibilizer together with at least two further polymers, in which case the proportion of the inventive modified polyolefins in the moulding materials is not more than 50% by mass, preferably not more than 40% by mass, more preferably not more than 30% by mass and especially preferably not more than 25% by mass.

The further constituents of the inventive moulding materials may especially comprise other polymers, in which case these other polymers may be one or more ethylene polymers and/or isotactic propylene polymers and/or syndiotactic propylene polymers and/or isotactic poly-1-butene polymers and/or syndiotactic poly-1-butene polymers.

In this context, there may preferably be a significant difference in the melt viscosity between the inventive polymers present and the polymers additionally present, measured by oscillation rheometry at 190° C., the polymers additionally present having at least twice as high a melt viscosity as the inventive polymers, more preferably a melt viscosity at least 3 times as high, more preferably one at least 4 times as high and especially preferably one at least 5 times as high.

The moulding materials mentioned can be used to produce finished products (for example by injection moulding) or to produce films and/or foils.

The inventive modified polymers may preferably be used as or in adhesives, especially preferably in adhesive formulations.

The inventive adhesive formulations may contain further constituents in addition to the inventive polymers. The further constituents may especially, in the case of solution formulations, be cyclic and/or linear aliphatic and/or aromatic hydrocarbons, and also corresponding halogenated hydrocarbons. In this context, the good solubility of the inventive polymers in different solvents, for example xylene and tetrahydrofuran, is found to be particularly advantageous. It is thus unnecessary to select halogenated solvents in order to be able to prepare a solution formulation. Preferably, therefore, no halogenated hydrocarbons are used. In the adhesive formulations which are liquid at room temperature, the hydrocarbons mentioned have a formulation content of not more than 90% by mass, preferably not more than 80% by mass, more preferably not more than 75% by mass and especially preferably of not more than 50% by mass.

Most preferably, the inventive adhesive formulation may be a hotmelt adhesive formulation which may be used for all kinds of adhesive bonds known to those skilled in the art.

The inventive hotmelt adhesive formulation may contain further constituents which are needed to achieve specific properties, for example deformability, adhesion capacity, proccessability, (melt or solution) viscosity, stability, crystallization rate, tack, storage stability, etc. In a particular embodiment of the present invention, the proportion of the further constituents is especially preferably not more than 10% by mass. This has the advantage that the material properties of the adhesive formulation are essentially those of the inventive polymer used. Such an adhesive formulation can be produced with a very low level of complexity.

Alternatively, in a further embodiment of the present invention, the proportion of the further constituents may be >10% by mass. In this case, the further constituents make up not more than 80% by mass of the overall formulation, preferably not more than 60% by mass, more preferably not more than 50% by mass, especially preferably not more than 40% by mass.

The further constituents may be inorganic and/or organic fillers which, as desired, may be electrically conductive or insulating, inorganic and/or organic pigments which may, as desired, be electrically conductive or insulating, synthetic and/or natural resins, especially adhesive resins, synthetic and/or natural oils, inorganic and/or organic, synthetic and/or natural polymers which may, as desired, be electrically conductive or insulating, inorganic and/or organic, synthetic and/or natural fibres which may, as desired, be electrically conductive or insulating, inorganic and/or organic stabilizers, inorganic and/or organic flame retardants.

More particularly, the further constituents include resins, the resins being used in order to adjust particular properties of the adhesive layer, especially the tack and/or adhesion, the flow and creep behaviour of the adhesive layer and/or the adhesive viscosity, to particular requirements. The resins may be natural resins and/or synthetic resins. In the case of natural resins, these natural resins contain, as the main constituent, abietic acid (e.g. rosin). The resins may also be terpene or polyterpene resins, petroleum resins and/or coumarone-indene resins, which are especially so-called $C_5$ resins and/or $C_9$ resins and/or copolymers of $C_5/C_9$ resins. The proportion of the resins in the inventive hotmelt adhesive formulation may especially be not more than 45% by mass, preferably in the range from 1 to 40% by mass, more preferably in the range from 2 to 30% by mass and especially preferably in the range from 3 to 20% by mass, based on the overall formulation.

In addition, the inventive hotmelt adhesive formulations may contain conventional amorphous poly($\alpha$-olefins) (known as APAOs) as further constituents. The amorphous poly($\alpha$-olefins) mentioned may be homo/copolymers and/or terpolymers of ethylene, propylene, 1-butene or linear and/or branched 1-olefins having 5-20 carbon atoms, which are obtainable, for example, by conventional Ziegler-Natta catalysis or metallocene catalysis. The proportion of the amorphous poly($\alpha$-olefins) is especially not more than 50% by mass, preferably not more than 40% by mass and more preferably not more than 30% by mass, based on the overall formulation. The further constituents are crystalline or semicrystalline polyolefins, which include especially isotactic polypropylene, syndiotactic polypropylene, polyethylene (HDPE, LDPE and/or LLDPE), isotactic poly(1-butene), syndiotactic poly(1-butene), copolymers thereof and/or copolymers thereof with linear and/or branched 1-olefins having 5 to 10 carbon atoms. It is additionally preferred that the crystalline or semicrystalline polyolefins are chemically modified polyolefins, the chemical modification including especially that by maleic anhydride, itaconic anhydride, acrylic acid, acrylates, methacrylates, unsaturated epoxy compounds, silane acrylates, silanes and hydroxyalkylsilanes.

In addition, the further constituents may include polymers with polar groups. Polymers with polar groups include polystyrene copolymers (for example with maleic anhydride, acrylonitrile, etc), polyacrylates, polymethacrylates, (co)polyesters, polyurethanes, (co)polyamides, polyetherketones, polyacrylic acid, polycarbonates and chemically modified polyolefins (for example polypropylene-graft-maleic anhydride) or poly(propylene-graft-alkoxyvinylsilane).

In addition, the further constituents may be homo- and/or copolymers based on ethylene, propylene, acrylonitrile, butadiene, styrene and/or isoprene; these polymers are especially block copolymers, especially rubbers, for example natural and synthetic rubber, poly(butadiene), poly(isoprene), styrene-butadiene rubber and nitrile rubber. The proportion of the polymers based on butadiene, styrene and/or isoprene is not more than 20% by mass, preferably 1-15% by mass, more preferably 1.5-10% by mass and especially 2-9% by mass, based on the hotmelt adhesive formulations.

In addition, the further constituents may include elastomeric polymers based on ethylene, propylene, and diene and/or cis,cis-1,5-cyclooctadiene, exo-dicyclopentadiene, endo-dicyclopentadiene and 1,4-hexadiene and 5-ethylidene-2-norbornene; these constituents are especially ethylene-propylene rubber, EPM (double bond-free, ethylene content 40-75% by mass) and/or EPDM. The proportion of polymers based on ethylene, propylene, a diene and/or cis,cis-1,5-cyclooctadiene, exo-dicyclopentadiene, endo-dicyclopentadiene, 1,4-hexadiene and 5-ethylidene-2-norbornene is typically not more than 20% by mass, preferably 1-15% by mass, more preferably 1.5-10% by mass and especially 2-9% by mass, based on the hotmelt adhesive formulations.

Alternatively, the further constituents may include waxes, especially modified and unmodified waxes, which are preferably crystalline, semicrystalline and/or amorphous poly-olefin waxes based on polyethylene, polypropylene and/or poly(1-butene), paraffin waxes, metallocene waxes, microwaxes, polyamide waxes, polytetrafluoroethylene waxes and/or Fischer-Tropsch waxes. The proportion of the waxes is not more than 50% by mass, preferably not more than 1-40% by mass, more preferably 2-30% by mass and especially preferably 3-20% by mass, based on the hotmelt adhesive formulations.

In addition, the further constituents may include fillers, the fillers being used in order to adjust specific property profiles of the adhesive layer, for example the temperature application range, the stability, the shrinkage, the electrical conductivity, the magnetism and/or the thermal conductivity, to specific requirements in a controlled manner. Generally, the fillers are inorganic and/or organic fillers. The inorganic fillers are especially selected from silicas (incl. hydrophobized silicas), quartz flour, chalks, barite, glass particles (especially spherical particles to increase light reflection), glass fibres, carbon fibres, asbestos particles, asbestos fibres and/or metal powders. Organic fillers are, for example, carbon black, bitumen, crosslinked polyethylene, crosslinked unvulcanized or vulcanized rubber mixtures, synthetic fibres, for example polyethylene fibres, polypropylene fibres, polyester fibres, polyamide fibres, Aramid fibres, Saran fibres, MP fibres, or natural fibres such as straw, wool, cotton, silk, flax, hemp, jute and/or sisal. The proportion of the fillers is not more than 80% by mass, preferably 1-60% by mass, more preferably 5-40% by mass and especially preferably 7-30% by mass, based on the hotmelt adhesive formulations.

The further constituents may likewise include stabilizers, which may be used in order to protect the adhesive formulation from external influences, for example the influence of (processing) heat, shear stress, solar irradiation, air humidity and oxygen. Suitable stabilizers are, for example, hindered amines (HALS stabilizers), hindered phenols, phosphites and/or aromatic amines. In the formulations mentioned, the proportion of the stabilizers is not more than 3% by mass, preferably in the range from 0.05 to 2.5% by mass and especially preferably in the range from 0.1 to 2% by mass, based on the hotmelt adhesive formulations.

In addition, the further constituents may include one or more oils, which may be natural and/or synthetic oils. These one or more oils preferably have, at the processing temperature, a viscosity of 1 to 1000 mPa*s, preferably of 2-750 mPa*s, most preferably of 3-500 mPa*s. Suitable oils are, for example, mineral oils, (medical) white oils, isobutene oils, butadiene oils, hydrogenated butadiene oils and/or paraffin oils. The proportion of the one or more oils is not more than 50% by mass, preferably 1-45% by mass, more preferably 3-40% by mass and especially 5-38% by mass, based on the hotmelt adhesive formulations.

In addition, the hotmelt adhesive formulations may contain inorganic and/or organic pigments, UV-active substances, organic and/or inorganic nucleating agents which accelerate the crystallization of the polymers and hence reduce the open time of the adhesive bond.

In a further preferred embodiment of the inventive hotmelt adhesive formulations, the formulations described above may be multiphase blends.

The inventive hotmelt adhesive formulations may be applied to the surface to be bonded especially by means of spray application, as bead(s) and/or by knife-coating.

The present invention further provides adhesive bonds containing one or more polymers of the present invention. More particularly, the adhesive bonds are packaging adhesive bonds, adhesive bonds of hygiene articles, wood adhesive bonds, adhesive bonds of glass surfaces, label adhesive bonds, lamination adhesive bonds, carpet or synthetic turf adhesive bonds, shoe adhesive bonds, pressure-sensitive adhesive bonds, book adhesive bonds or textile adhesive bonds.

In the case of packaging adhesive bonds, the packaging materials may comprise the materials of wood, cardboard, paper, plastic, metal, ceramic, glass, synthetic and/or natural fibres and/or textiles. The packaging materials are preferably nonpolar polymers, especially polyethylene, polypropylene, poly(1-butene) or copolymers thereof with linear and/or branched $C_{2-20}$ 1-olefins, for example uncrosslinked polyethylene, for example LDPE, LLDPE and/or HDPE, and/or (e.g. silane-)crosslinked polyolefin, especially silane-crosslinked polyethylene. In addition, the nonpolar polymers may especially be polystyrene, polybutadiene, polyisoprene homo- and/or copolymers, and/or copolymers thereof with linear and/or branched $C_{2-20}$ 1-olefins or dienes, for example EPDM, EPM or EPR, and/or synthetic or natural rubber.

In the case of polar polymers, they are especially polyacrylates, especially polyalkyl methacrylates, polyvinyl acetate, polyesters and/or copolyesters, especially polyethylene terephthalate and/or polybutylene terephthalate, polyamides and/or copolyamides, acrylonitrile copolymers, especially acrylonitrile/butadiene/styrene copolymers and/or styrene/acrylonitrile copolymers, maleic anhydride copolymers, especially S/MA copolymers and/or MA-grafted polyolefins, for example polypropylene and/or polyethylene, polyvinyl chloride and/or polycarbonates.

Generally, the packaging materials may be present in the form of a carton, box, container, sheet, panel, film and/or foil. For example, corresponding polymer films can be produced by means of extrusion, calendering, blow-moulding, casting technology, solution drawing, thermoforming or a combination of a plurality of these techniques. For example, the polymer films are monolayer films which are oriented or unoriented. In the case of orientation of the monolayer film, monoaxial, biaxial or multiaxial orientation may be present, in which case the axes of orientation may be at any angle to the film draw direction. Alternatively, the polymer films may be multilayer films, in which case the film layers may be manufactured from the same material or from different materials. The multilayer films may be oriented or unoriented. In the case of orientation of the multilayer polymer films, a monoaxial, biaxial or multiaxial orientation may be present, in which case the axes of orientation may be at any angle to the film draw direction. In a particular embodiment, the multilayer polymer film is a composite film. In the adhesive bonding of composite films, one or more of the film layers may consist of composite material, in which case the composite materials may be present in continuous form (for example paper, aluminium film or the like) and/or discontinuous form (for example particles/fibres).

In particular, in the case of adhesive bonding of plastics packaging materials according to the present invention, generally no chemical and/or energetic pretreatments of the polymer surfaces (e.g. plasma, corona treatment, etching, sulphonation, etc) may be needed for the achievement of adhesion.

In the case of adhesive bondings of wood packaging materials, the wood packaging may be solid real wood, real wood laminates, polymer laminates, MDF panels or similar wood-like substances. It is possible to use either low-resin or low-oil woods, for example beech, oak, etc., but also resin-rich or oil-rich woods, such as teak, pine, etc.

In the packaging adhesive bonds mentioned, preferably at least one of the inventive polymers present has an open time of less than 30 seconds.

There are in principle no restrictions in the adhesive bonds of hygiene articles; for example, they may be nappies, napkins, etc. In general, the inventive adhesive bond forms a multilayer structure which includes different materials, for example polymer films and nonwovens. In addition, moisture-absorbing substances, for example polyacrylic acid particles, may be present in the adhesive bond.

A further field of use of the inventive adhesive bonds may be structural wood adhesive bonds, especially edge gluing and/or decorative paper covering and/or decorative film lamination and/or assembly adhesive bonds.

A further significant field of use of the inventive adhesive bonds may be that of adhesive bonds involving a glass surface. In this case, the adhesive bond may contain moisture-absorbing substances, for example silica gel, polyacrylic acid particles, etc. The composite in this context is preferably a multipane insulating glass composite. For this purpose, all types of multipane insulation glass composites known to those skilled in the art are suitable, irrespective of the individual construction, for example with or without further spacers.

In addition, a lamination may be carried out in the case of inventive adhesive bonds involving a glass surface.

Furthermore, the glass surface may be the surface of glass fibres, for example the surface of a glass fibre cable, as used, for example, for data and/or telephone lines.

In a further embodiment of the present invention, the article to be adhesive bonded may be a label. The label may consist of a paper film, polymer film, metal foil and/or multilayer film and may especially be used for the labelling of lacquered, coated, anodized and/or otherwise surface-treated metal cans, especially tin plate cans, and glass or plastic (especially PET) bottles. In particular, the adhesive for label adhesive bonds may be a so-called "pressure-sensitive" adhesive (PSA).

In a further embodiment of the present invention, the adhesive bonds are a lamination, in which case the surface to be laminated may be the surface of an inorganic and/or organic substance, preferably made of metals (e.g. steel, aluminium, brass, copper, tin, zinc, enamel), of glass, of ceramics and/or inorganic building materials, for example open- or closed-pore concrete. In addition, the surface may be wood, paper, cardboard and/or plastics. The surface may itself be a composite material composed of inorganic and organic materials (for example glass fibre composite materials). In this case, the colaminated lamination material may be of inorganic and/or organic nature. Examples of colaminated inorganic lamination materials are ultrathin glass panes, ceramic membranes and/or metal foils (e.g. aluminium foil). Corresponding examples of colaminated organic lamination materials are paper, cardboard, wood varnish, plastics, natural and/or synthetic textiles, nonwovens, synthetic leather and/or natural leather.

It will be appreciated that the inventive adhesive bonds may also be an adhesive bond in an automobile interior (for example sun visors, roof liners, etc).

In a further preferred embodiment of the present invention, the adhesive bonds may be for producing carpets and/or synthetic turf. In particular, the adhesive bond is used for tuft and filament binding. The fibres or fibre composites to be bound may be natural and/or synthetic fibres. Examples of natural fibres or fibre composites are wool, cotton, sisal, jute, straw, hemp, flax, silk and/or mixtures of these fibres.

Examples of synthetic fibres or fibre composites to be bound are (co)polyamide fibres, polyethylene fibres, (co)polyester fibres, polypropylene fibres and/or mixtures of these fibres. In the case of synthetic turf adhesive bonds, the filaments bound by the adhesive bond are selected from polypropylene filaments, polyethylene filaments, polyamide filaments, polyester filaments or mixed filaments of the polymers listed.

Preference is given to using the adhesive bond for coating of carpet backing. In addition, a textile substrate can additionally be colaminated. The resulting carpet elements are, for example, so-called meter products, carpet tiles or a subsequently deformable automotive carpet. In the applications mentioned for tuft and filament binding, the inventive polyolefin present has a melt viscosity at 190° C. of not more than 10 000 mPa*s, preferably of 500 to 8000 mPa*s, more preferably of 600 to 6000 mPa*s and especially preferably of 750 to 4000 mPa*s. The proportion of the inventive polyolefins is especially 60-98% by mass. The application weight is especially 20-1500 g/m². Further examples are within the technical ability of a person skilled in the art.

In addition, the inventive adhesive bonds may be shoe adhesive bonds, which can be used, for example, in the sports shoes sector and/or for producing so-called split leather.

Adhesive bonds likewise in accordance with the invention are so-called "pressure-sensitive adhesive bonds" (PSAs). It is advantageous here when at least one of the inventive polymers and/or formulation constituents present has "cold flow" (i.e. a melting point below room temperature). Formulation constituents with cold flow are, for example, poly(1-hexene), poly(1-octene), poly(1-hexene-co-1-octene), polyacrylates, etc.

In the case of book adhesive bonds, the bonds are generally an adhesive bond which is undertaken in the book-binding operation.

In the case of textile adhesive bonds, a plurality of textile layers may be bonded to one another at particular points or extensively, and the textile elements to be bonded may include natural or synthetic materials. In particular, the natural textile elements are wool, horsehair, cotton, linen fabric, hemp, jute, sisal, flax, straw and/or leather. Preferred synthetic textile elements contain, as constituents, polypropylene, polyethylene, (co)polyamides, (co)polyesters, nylon, perlon and/or Keflar®. In particular, one or more of the elements to be bonded may be an insert. In a particular embodiment, the inventive adhesive formulation is introduced in the form of a powder between the textile layers to be adhesive bonded and activated by thermal energy (for example with the aid of an ironing press).

In a likewise inventive embodiment of the present invention, the inventive polymers may be used in marking materials, coating materials, sealing membranes or roof membranes.

The inventive marking materials may contain the further constituents already mentioned in the description of the moulding materials and adhesive formulations. For example, the inventive marking materials can be used as road marking materials.

In the case of coating materials, the material may, for example, be a coating material for cardboard or paper coating.

In addition, the inventive polymers may be suitable for use in sealing membranes. In addition to the inventive polymers, the sealing membranes may contain further constituents; more particularly, the further constituents may be other polymers, fillers and bitumen. In the case of roof membranes, the proportion of the inventive polymers is not more than 30% by mass, preferably not more than 27% by mass, more preferably not more than 25% by mass and especially preferably not more than 22% by mass, based on the roof membrane. In particular, the sealing membranes are roof membranes. In the case of the roof membranes, at least one of the inventive polymers has a glass transition temperature of not more than −10° C., preferably of not more than −15° C., more preferably of not more than −18° C. and especially preferably of not more than −20° C.

In addition, the inventive polymers may be suitable for use as primers, adhesion promoters or in primer formulations and/or in adhesion promoter formulations, especially the absence of halogenated organic constituents being advantageous. In particular, primer and adhesion promoter formulations which contain the inventive polymers are used in order to achieve adhesion of organic coatings and/or adhesives to untreated polyolefin surfaces, especially to untreated polypropylene. In a specific case, the primer and/or adhesion promoter formulations are applied as a primer to polypropylene mouldings, for example automotive shock absorbers and/or lining parts, in order to achieve better adhesion of the subsequent paint system.

In addition, the inventive polymers may be suitable for use in aqueous dispersions, suspensions and/or emulsions. In addition to the inventive polymers, it is possible for surface-active substances (for example inorganic and/or organic surfactants of ionic and/or nonionic nature) and further polymers, especially those with polar monomer units (for example poly(propylene-graft-maleic anhydride)), to be present in the dispersions, suspensions and/or emulsions. The aqueous dispersions, suspensions and/or emulsions are preferably prepared using a solution of the inventive polymers, especially in tetrahydrofuran or xylene. Preparation using a melt of the inventive polymers is also possible, in which case preference is given to using polymers with a melting/softening temperature of <100° C., especially preferably of <90° C.

In the aqueous dispersions, suspensions and/or emulsions mentioned, the proportion of the inventive polyolefins is more than 10% by mass based on the overall formulation.

Even without any further remarks, it is assumed that a person skilled in the art can utilize the above description to the widest possible degree. The preferred embodiments and examples should consequently be interpreted merely as descriptive disclosure which should in no way whatsoever be interpreted as a limitation. Alternative embodiments of the present invention are obtainable in analogous manner.

Having generally described this invention, a further understanding can be obtained by reference to certain specific examples which are provided herein for purposes of illustration only, and are not intended to be limiting unless otherwise specified.

EXAMPLES

Analysis
a) High-Temperature $^{13}$C NMR

The polymer composition was determined by means of high-temperature $^{13}$C NMR. $^{13}$C NMR spectroscopy of polymers is described, for example, in the following publications:

[1] S. Berger, S. Braun, H.-O. Kalinowski, $^{13}$C-NMR-Spektroskopie [$^{13}$C NMR Spectroscopy], Georg Thieme Verlag Stuttgart 1985

[2] A. E. Tonelli, NMR Spectroscopy and Polymer Microstructure, Verlag Chemie Weinheim 1989

[3] J. L. Koenig, Spectroscopy of Polymers, ACS Professional Reference Books, Washington 1992

[4] J. C. Randall, Polymer Sequence Determination, Academic Press, New York 1977

[5] A. Zambelli et al: Macromolecules, 8, 687 (1975)

[6] A. Filho, G. Galland: J. Appl. Polym. Sci., 80, 1880 (2001)

b) High-Temperature GPC

The molecular weight was determined by means of high-temperature GPC. The determination was carried out to ASTM D6474-99, but at a higher temperature (160° C. instead of 140° C.) and a lower injection volume of 150 µl instead of 300 µl. Further literature cited for the GPC analysis of polymers is:

H. G. Elias: "Makromoleküle"; vol. 2; Wiley-VCH; Weinheim 2001;

Z. Grubisic, P. Rempp, H. Benoit; Polym. Lett.; 5; 753 (1967);

K. A. Boni, F. A. Sliemers, P. B. Stickney; J. Polym. Sci.; A2; 6; 1579 (1968);

D. Goedhart, A. Opschoor; J. Polym. Sci.; A2; 8; 1227 (1970);

A. Rudin, H. L. W. Hoegy; J. Polym. Sci.; A1; 10; 217 (1972);

G. Samay, M. Kubin, J. Podesva; Angew. Makromol. Chem.; 72; 185 (1978);

B. Ivan, Z. Laszlo-Hedvig, T. Kelen, F. Tüdos; Polym. Bull,; 8; 311 (1982);

K.-Q. Wang, S.-Y. Zhang, J. Xu, Y. Li, H. P. Li; J. Liqu. Chrom.; 5; 1899 (1982);

T. G. Scholte, H. M. Schoffeleers, A. M. G. Brands; J. Appl. Polym. Sci.; 29; 3763 (1984).

The solvent used was trichlorobenzene. The analysis was effected at a column temperature of 160° C. The universal calibration used for the evaluation of the elution curves was carried out on the basis of polyolefin standards. The results are not comparable to analyses whose calibrations were effected on the basis of another kind of polymer—for example based on polystyrene—or which had been effected without universal calibration, since an inadmissible comparison of different three-dimensional polymer structures and/or hydrodynamic radii is otherwise made. The comparison with measurements using solvents other than that specified is also inadmissible, since different three-dimensional polymer structures and/or hydrodynamic radii may be present in different solvents, which leads to a different result in the molecular weight determinations.

The polydispersity $P_d$ is defined as the quotient of number-average and weight-average molar mass. It is more particularly a measure of the breadth of the molar mass distribution present, which in turn permits conclusions about the polymerization behaviour present. It is determined by means of high-temperature GPC. Within certain limits, a polydispersity is characteristic for a particular catalyst-cocatalyst combination. The polydispersity has a relatively strong influence on the tack of the material at room temperature, and on the adhesion.

In the determination of the molar masses by means of gel permeation chromatography (GPC), the hydrodynamic radius of the polymer chains present in solution plays a crucial role. As well as thermal conductivity, RI (refractive index) and UV/VIS and FTIR or light scattering detectors, the detection mechanisms used are also viscosity detectors. When the polymer chain is considered as an undisturbed ball, the relationship between its limiting viscosity number and the molar mass can be described empirically by the so-called KMHS equation $$[\eta]=K_v M_v^\alpha$$

(H.-G. Elias, Makromoleküle, volume 2, 6th edition, Wiley-VCH, Weinheim 2001, p. 411-413). $K_v$ and $\alpha$ here are constants which are influenced both by the constitution, configuration and molar mass of the polymer, and by the solvent and the temperature. The significant conclusion of the alpha value in the present invention is that of the hydrodynamic radius, which depends more or less on the branch sites present on the polymer chains. The alpha value is high in the case of low branching, and low in the case of higher branching.

c) Rheology

The rheological measurements were effected according to ASTM D 4440-01 ("Standard Test Method for Plastics: Dynamic Mechanical Properties Melt Rheology") using an Anton Paar MCR 501 rheometer with a plate-plate geometry (plate diameter: 50 mm) as the oscillation meter. The maximum sample deformation used in all measurements was 1%; the temperature-dependent measurements were carried out at a measurement frequency of 1 Hz and a cooling rate of 1.5 K/min.

The melt viscosity was determined by oscillation rheometry, working at a shear rate of 1 Hz. The maximum deformation of the sample was selected such that the sample was within the linear viscoelastic range over the entire analysis time. Compared to Hookean solids, viscoelastic materials are notable for the ability to dissipate stresses resulting from a deformation over a particular time (relaxation). In contrast to Newtonian liquids, which are subject to exclusively irreversible deformation under the action of shearing/elongation, viscoelastic fluids can recover a portion of deformation energy once the shear force has been removed (so-called "memory effect") [N. P. Cheremisinoff; "*An Introduction to Polymer Rheology and Processing*"; CRC Press; London; 1993]. A further characteristic of polymeric melts is the occurrence of a so-called structural viscosity. This refers to behaviour in which the shear stress as the force which occurs degrades the starting structure of the material as a function of the shear rate. Since this degradation process requires a minimum shear rate, the material flows like a Newtonian liquid under this shear rate. An explanation is given by the Le Chatelier principle, the "evasion" of the structurally-viscous liquid (to evade the mechanical stress) being in the direction along the shear surfaces to reduce the frictional resistance. The latter leads to the degradation of the equilibrium structure of the starting state and to the formation of a shear-oriented structure, which in turn has the consequence of easier flow (viscosity reduction). In polymer melts, the Newtonian region is perceptible only at very low shear rates and/or low shear amplitudes. Its determination is possible by means of rheometric test methods (amplitude "sweeps", i.e. measurement at fixed frequency as a function of the shear amplitude), and is necessary when the measurement is to be carried out in a reversible, i.e. reproducible, range [R. S. Lenk; "*Rheologie der Kunststoffe*" [*Rheology of the Plastics*]; C. Hanser Verlag; Munich; 1971; J. Meissner; "*Rheologisches Verhalten von Kunststoff-Schmelzen und-Lösungen*" [*Rheological behaviour of polymer melts and solutions*] in: "*Praktische Rheologie der Kunststoffe*" [*Practical rheology of the plastics*]; VDI-Verlag; Düsseldorf; 1978; J.-F. Jansson; Proc. 8*th. Int. Congr. Rheol.;* 1980; Vol. 3]. Owing to the low force which acts therein, its low deformation and the consequently minor effect on the sample morphology, vibrational rheometry is particularly suitable for the study of materials which exhibit structurally-viscous behaviour.

d) Needle Penetration

The needle penetration was determined according to DIN EN 1426.

e) DSC

The melting enthalpy, the glass transition temperature and the melting range of the crystalline fraction were determined by means of differential scanning calorimetry (DSC) according to DIN 53 765 from the 2nd heating curve at a heating rate of 10 K./min. The turning point of the heat flow curve was evaluated as the glass transition temperature.

f) Xylene Solubility

A xylene isomer mixture was used, the polymer was dissolved under reflux and then the solution was cooled to room temperature.

2 g of polyolefin were dissolved in 250 ml of xylene with stirring and heating up to the boiling point of xylene. Once the mixture had been boiled under reflux for 20 min, the polymer solution was allowed to cool to 25° C. Undissolved and precipitated polyolefin was additionally filtered off with suction (15 cm suction filter, Sartorius 390 filter paper) and dried. The remaining polymer solution is precipitated in a 5-fold excess of methanol (with one drop of 37 percent aqueous HCl). The resulting precipitate was filtered off with suction and dried at 80° C. in a drying cabinet (vacuum).

g) Solubility in THF

Solubility in THF is a characteristic of semicrystalline polyolefins. The procedure was analogous to the dissolution tests in xylene.

h) Tensile Strength and Elongation at Break

The tensile strength and elongation at break were determined according to DIN EN ISO 527-3.

i) Softening Point (Ring & Ball)

The softening point was determined by the ring and ball method according to DIN EN 1427.

j) Adhesive Shear Strength

The adhesive shear strength was determined according to DIN EN 1465.

k) XRF Spectroscopy

The samples which had been poured into aluminium dishes and cured were cut out with a cutting die (diameter 30 mm). The determination was effected as a double determination. The layer thickness of the polymer samples was >5 mm. The samples were placed in a sample holder and analysed (instrument: PANalytical PW 2404). The quantitative determination was effected against an external calibration of Si in borax tablets.

The test methods described relate to every measurement in the context of the present invention, irrespective of whether the base polymer to be grafted or the inventive polyolefin was involved.

Examples of Modified Polyolefins a) Preparation (Polymerization) of the Base Polymers The base polymers were prepared as described in DE102008005945.

b) Base Polymers and Noninventive Comparative Base Polymers

The polymer composition and the microstructure of the polymers prepared were determined by means of high-temperature $^{13}$C NMR (Table 1).

TABLE 1

| | Polymer from polymerization experiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polymer composition | | | | | | | | | | | | |
| Ethylene [% by mass] | 0 | 0 | 0 | 8 | 6 | 6 | 3 | 0 | 0 | 6 | 0 | 0 |
| Propylene [% by mass] | 83 | 91 | 100 | 78 | 78 | 79 | 83 | 66 | 75 | 87 | 100 | 92.3 |
| 1-Butene [% by mass] | 17 | 9 | 0 | 14 | 16 | 15 | 14 | 34 | 25 | 7 | 0 | 7.7 |
| Propylene triads | | | | | | | | | | | | |
| Isotactic [% by mass] | 4 | 5 | 4 | 3 | 2 | 2 | 3 | 2 | 3 | 3 | 7 | 7 |
| Syndiotactic [% by mass] | 64 | 74 | 83 | 71 | 69 | 73 | 70 | 42 | 60 | 77 | 75 | 75 |
| Atactic [% by mass] | 32 | 22 | 13 | 26 | 29 | 25 | 27 | 55 | 37 | 20 | 18 | 18 |
| 1-Butene triads | | | | | | | | | | | | |
| Isotactic [% by mass] | 0 | 0 | — | 0 | 0 | 0 | 15 | 18 | 12 | 36 | — | 34 |
| Syndiotactic [% by mass] | 94 | 91 | — | 2 | 0 | 6 | 6 | 0 | 0 | 0 | — | 40 |
| Atactic [% by mass] | 6 | 9 | — | 98 | 100 | 94 | 79 | 82 | 88 | 64 | — | 26 |
| Ethylene triads [% by mass] | — | — | — | 0.4 | 0.1 | 0 | 0 | — | — | — | — | — |

| | Polymer from polymerization experiment | | | | | | | | |
|---|---|---|---|---|---|---|---|---|---|
| | 13 | 14 | 15 | 16 | 17 | 18** | 19** | 20** | 21** |
| Polymer composition | | | | | | | | | |
| Ethylene [% by mass] | 5.3 | 6.1 | 9.9 | 0 | 0 | 0 | 7.4 | 12.6 | 4 |
| Propylene [% by mass] | 94.7 | 93.9 | 90.1 | 10 | 91.7 | 59 | 77 | 74.5 | 96 |
| 1-Butene [% by mass] | 0 | 0 | 0 | 0 | 8.3 | 41 | 15.6 | 12.9 | 0 |
| Propylene triads | | | | | | | | | |
| Isotactic [% by mass] | 5 | 6 | 6 | 7 | 6 | 75 | 75 | 69 | 74 |
| Syndiotactic [% by mass] | 76 | 76 | 71 | 75 | 68 | 13 | 5 | 13 | 6 |
| Atactic [% by mass] | 19 | 18 | 23 | 18 | 26 | 12 | 20 | 18 | 20 |
| 1-Butene triads | | | | | | | | | |
| Isotactic [% by mass] | — | — | — | — | — | 80 | 45 | 32 | — |
| Syndiotactic [% by mass] | — | — | — | — | — | 3 | 5 | 9 | — |
| Atactic [% by mass] | — | — | — | — | — | 17 | 49 | 58 | — |
| Ethylene triads [% by mass] | 0 | 0 | 4.1 | — | — | — | 0.7 | 5.6 | 0 |

**Noninventive c) Molar Masses, Molar Mass Distribution and Polymer Branching

The molecular weight was determined by means of high-temperature GPC. The determination was performed to ASTM D6474-99, but at a higher temperature (160° C. instead of 140° C.) and with a lower injection volume of 150 μl instead of 300 μl. The low molecular weight constituents were determined from the molar mass distribution curves obtained by integration of the appropriate areas (Table 2).

TABLE 2

| | Polymer from polymerization experiment | | | | |
|---|---|---|---|---|---|
| | 1 | 2 | 3 | 4 | 5 |
| Modality MMV | n.d. | n.d. | monomodal | monomodal | n.d. |
| $M_w$ [g/mol] | n.d. | n.d. | 53200 | 64000 | n.d. |
| Pd [—] | n.d. | n.d. | 1.6 | 1.6 | n.d. |
| α [—] | n.d. | n.d. | 1.04 | 0.99 | n.d. |
| Constituents 1000-500 D | n.d. | n.d. | 0 | 0 | n.d. |
| Constituents < 500 D | n.d. | n.d. | 0 | 0 | n.d. |

| | Polymer from polymerization experiment | | | | |
|---|---|---|---|---|---|
| | 6 | 7 | 8 | 9 | 10 |
| Modality MMV | n.d. | monomodal | n.d. | n.d. | n.d. |
| $M_w$ [g/mol] | n.d. | 56600 | n.d. | n.d. | n.d. |
| Pd [—] | n.d. | 1.4 | n.d. | n.d. | n.d. |
| α [—] | n.d. | 1.15 | n.d. | n.d. | n.d. |
| Constituents 1000-500 D | n.d. | 0 | n.d. | n.d. | n.d. |
| Constituents < 500 D | n.d. | 0 | n.d. | n.d. | n.d. |

| | Polymer from polymerization experiment | | | | |
|---|---|---|---|---|---|
| | 11 | 12 | 13 | 14 | 15 |
| Modality MMV | bimodal | bimodal | bimodal | bimodal | bimodal |
| $M_w$ [g/mol] | 82500 | 33600 | 42500 | 29800 | 17500 |
| Pd [—] | 1.7 | 1.6 | 1.6 | 1.7 | 1.8 |
| α [—] | 0.76 | 0.9 | 0.89 | 0.89 | 0.97 |
| Constituents 1000-500 D | 0 | 0 | 0 | 0 | 0.03 |
| Constituents < 500 D | 0 | 0 | 0 | 0 | 0 |

| | Polymer from polymerization experiment | | | | | |
|---|---|---|---|---|---|---|
| | 16 | 17 | 18** | 19** | 20** | 21** |
| Modality MMV | bimodal | n.d. | Monomodal | Monomodal | Monomodal | bimodal |
| $M_w$ [g/mol] | 18500 | n.d. | 195000 | 30000 | 18400 | 14000 |
| Pd [—] | 1.8 | n.d. | 8.6 | 2.6 | 1.6 | 1.6 |
| α [—] | 0.9 | n.d. | 0.68 | 0.58 | 1.04 | 0.82 |
| Constituents 1000-500 D | 0 | n.d. | 0.31 | 0.3 | 0 | 0 |
| Constituents < 500 D | 0 | n.d. | 0.19 | 0 | 0 | 0 |

**Noninventive; n.d.: not determined d) Inventive Modified Polymers

Preparation of the inventive modified polyolefins in the melt:

A semicrystalline polyolefin (for composition and material parameters see Tables 1 & 2) was mixed in a twin-screw extruder (Berstorff ZE40) with the monomer vinyltrimethoxysilane and the initiator dicumyl peroxide (for amounts see Table 3) at a particular reaction temperature (see Table 3) for approx. 90 seconds (residence time). The excess monomer was evaporated in the last zone of the extruder at a reduced pressure of approx. 20 mbar. This was followed by stabilization by approx. 0.3% by mass of IRGANOX 1076.

TABLE 3

| | Ex. A (non-inventive) | Ex. B (noninventive) | Ex. C (inventive) | Ex. D (inventive) |
|---|---|---|---|---|
| Base polymer according to example | 19 | 20 | 4 | 7 |
| Base polymer in the extruder feed [% by mass] | 88 | 88 | 88 | 88 |
| Vinyltrimethoxysilane in the extruder feed [% by mass] | 11 | 11 | 11 | 11 |
| Dicumyl peroxide in the extruder feed [% by mass] | 1 | 1 | 1 | 1 |

TABLE 3-continued

|  | Ex. A (non-inventive) | Ex. B (noninventive) | Ex. C (inventive) | Ex. D (inventive) |
|---|---|---|---|---|
| Reaction temperature [° C.] | 170 | 170 | 170 | 170 |
| Si [% by mass] | 0.8 | 0.5 | 0.5 | 0.4 | e) Adhesive Bonds

Wood Bonds

The polyolefins modified in accordance with the invention were melted at 190° C. in a drying cabinet under protective gas atmosphere (e.g. nitrogen, argon, etc.) for one hour, and then applied at a temperature of 170° C. (with the aid of a temperature sensor) to a wood specimen (wood type: solid beech). This wood specimen was joined within 20 seconds to a further wood specimen (wood type: solid beech) over an area of 4 cm2 with a simple overlap, and pressed on with a weight of 2 kg for 5 minutes. Excess adhesive polymer was removed. Subsequently, the bonded specimen was stored for a certain number of days at 20° C./65% rel. air humidity in a climate-controlled cabinet, and was then tested for its mechanical properties by means of tensile testing.

Polypropylene Bonds

The polyolefins modified in accordance with the invention were melted at 190° C. in a drying cabinet under protective gas atmosphere (e.g. nitrogen, argon, etc.) for one hour, and then applied at a temperature of 170° C. (with the aid of a temperature sensor) to a polypropylene specimen (isotactic polypropylene, "PP-DWST"/manufacturer: Simona AG). This polypropylene specimen was joined within 20 seconds to a further polypropylene specimen ("PP-DWST"/manufacturer: Simona AG) over an area of 4 cm2 with a simple overlap, and pressed on with a weight of 2 kg for 5 minutes. Excess adhesive polymer was removed. Subsequently, the bonded specimen was stored for a certain number of days at 20° C./65% rel. air humidity in a climate-controlled cabinet, and was then tested for its mechanical properties by means of tensile testing.

Adhesive Bonds/Coatings of PMMA 100 g of each of the polyolefins modified in accordance with the invention were melted in a drying cabinet at 180° C. under a protective gas atmosphere (e.g. nitrogen, argon, etc.) for 1 hour. Subsequently, the polymer melt was applied at 170° C. (with the aid of a temperature sensor) to a polymethyl methacrylate specimen ("7N" moulding material, Evonik Röhm GmbH). This polymethyl methacrylate specimen was applied within 20 seconds to a further polymethyl methacrylate specimen ("7N" moulding material, Evonik Röhm GmbH) over an area of 4 cm2 with a simple overlap, and pressed together with a weight of 2 kg for 5 minutes. Excess adhesive polymer was removed. Subsequently, the bonded specimen was stored for 14 days at 20° C./65% rel. air humidity in a climate-controlled cabinet, and was then tested for its mechanical properties by means of tensile testing.

Adhesive Bonds of Aluminium 100 g of each of the polyolefins modified in accordance with the invention were melted in a drying cabinet at 180° C. under a protective gas atmosphere (e.g. nitrogen, argon, etc.) for 1 hour. Subsequently, the polymer melt was applied at a specific bonding temperature (with the aid of a temperature sensor) to a aluminium specimen (99.5, dimensions: 100 mm×20 mm×1.5 mm). This aluminium specimen was applied within 20 seconds to a further aluminium specimen (99.5, dimensions: 100 mm×20 mm×1.5 mm) over an area of 4 cm$^2$ with a simple overlap, and pressed together with a weight of 2 kg for 5 minutes. Excess adhesive polymer was removed. Subsequently, the bonded specimen was stored for 14 days at 20° C./65% rel. air humidity in a climate-controlled cabinet, and was then tested for its mechanical properties by means of tensile testing.

TABLE 4

| Bond | | Adhesive shear strength after storage time of 2 weeks [N/mm$^2$] |
|---|---|---|
| Ex. A (noninventive) | beech | 0.59 |
|  | PP | 0.51 |
|  | PMMA | 0.53 |
|  | Alu | 0.42 |
| Ex. B (noninventive) | beech | 1.3 |
|  | PP | 1.22 |
|  | PMMA | 0.45 |
|  | Alu | 0.46 |
| Ex. C (inventive) | beech | 4.14 |
|  | PP | 1.77 |
|  | PMMA | 2.29 |
|  | Alu | 0.41 |
| Ex. D (inventive) | beech | 3.33 |
|  | PP | 2.74 |
|  | PMMA | 0.72 |
|  | Alu | 0.57 |

The inventive modified polymers have significantly better adhesive properties than the corresponding comparative examples.

German Patent Application No. 102009027447.2, filed Jul. 3, 2009, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A modified polyolefin, obtained by functionalization of a unfunctionalized polyolefin which is obtained by polymerizing a monomer composition, comprising:
   ethylene in a proportion of not more than 20% by mass;
   propylene in a proportion of either 50-98% by mass or not more than 15% by mass; and
   1-butene in a proportion of 87-98% by mass or not more than 55% by mass;
   wherein
   a sum of the proportions is 100% by mass and the unfunctionalized polyolefin comprises no components of <500 D,
   a triad distribution for the propylene in the unfunctionalized polyolefin comprises:
     32-90% by mass of a syndiotactic triad,
     not more than 25% by mass of an isotactic triad, and
     not more than 65% by mass of an atactic triad, and/or
   a triad distribution for the 1-butene in the unfunctionalized polyolefin comprises:
     not more than 96% by mass of a syndiotactic triad, and
     not more than 45% by mass of a isotactic triad,
   the triad content is determined by $^{13}$C NMR,
   the sum of isotactic, syndiotactic and atactic triads of propene and 1-butene each add up to 100%,
   the unfunctionalized polyolefin is obtained by polymerization with a metallocene catalyst, and
   functionalizing the unfunctionalized polyolefin comprises grafting one or more monomers having one or more functional groups onto the unfunctionalized polyolefin.

2. The modified polyolefin according to claim 1, wherein a ratio of syndiotactic to atactic propene triads is in the range from 1:0.1 to 1:2.

3. The modified polyolefin according to claim 1, wherein a content of low molecular weight constituents with a molecular weight of 500 to 1000 daltons in the unfunctionalized polyolefin is not more than 0.75% by mass by gel permeation chromatography.

4. The modified polyolefin according to claim 1, wherein the unfunctionalized polyolefins used to prepare the inventive functionalized polyolefins have no polymer content with a molecular weight of 1000 to 500 daltons detectable by ht-GPC with universal calibration.

5. The modified polyolefin according to claim 1, wherein the one or more monomers having functional groups is selected from the group consisting of a carboxylic acid, a carboxylic acid derivative, an acrylate, a vinylsilane, a vinylaromatic, a cyclic imido ester and a vinyl compound thereof, a vinylimidazoline, a vinylpyrrolidone and an alicyclic vinyl compound.

6. The modified polyolefin according to claim 1, wherein the unfunctionalized polyolefin is selected from the group consisting of a poly(ethylene-co-propylene) copolymer with an ethylene content of not more than 20% by mass, a poly(ethylene-co-1-butene) copolymer with an ethylene content of not more than 20% by mass, a poly(propylene-co-1-butene) copolymer with a propylene content of not more than 15% by mass, a poly(propylene-co-1-butene) copolymer with a 1-butene content of not more than 55% by mass, and a poly(ethylene-co-propylene-co-1-butene) terpolymer with an ethylene content of not more than 20% by mass.

7. The modified polyolefin according to claim 1, wherein the metallocene catalyst is a compound of formula I

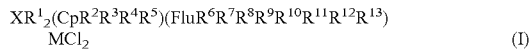

$$XR^1{}_2(CpR^2R^3R^4R^5)(FluR^6R^7R^8R^9R^{10}R^{11}R^{12}R^{13})MCl_2 \quad (I)$$

wherein
M is a transition metal selected from Zr, Hf and Ti,
Cp is a cyclopentadienyl group,
Flu is a fluorenyl group,
X is Si or C
$R^1$ is a linear or branched alkyl groups having 1 to 6 carbon atoms, alkoxyalkyl groups having 1 to 6 carbon atoms, aryl groups or alkoxyaryl groups, and
$R^2$ to $R^{13}$ are each independently H, linear or branched alkyl groups having 1 to 10 carbon atoms, and
$XR^1{}_2$ joins the cyclopentadienyl ligands and the fluorenyl ligands as a bridge.

8. A process for preparing the modified polyolefin according to claim 1, comprising:
contacting the unfunctionalized polyolefin with at least one free-radical initiator and monomers having one or more functional groups, and
graft reacting the monomers having one or more functional groups onto the unfunctionalized polyolefin.

9. The process according to claim 8, wherein the monomer having one or more functional groups is selected from the group consisting of a carboxylic acid, a carboxylic acid derivative, an acrylate, a vinylsilane, a vinylaromatic, a cyclic imido ester and a vinyl compound thereof, a vinylimidazoline, a vinylpyrrolidone and an alicyclic vinyl compound.

10. The process according to claim 8, wherein the graft reaction is in a solution or in a melt.

11. The process according to claim 10, wherein a temperature of the graft reaction is from 30 to 250° C.

12. A composition, comprising the modified polyolefin according to claim 1,
wherein the composition is one selected from the group consisting of a moulding material, a protective material, an adhesive, a sealant, a floor covering, a marking material, a coating material, a sealing membrane or roof membrane, a primer or a primer formulation, and an adhesion promoter formulation.

13. A moulding material, protective material, adhesive, sealant, floor covering, marking material, coating material, sealing membrane or roof membrane, primer, primer formulation, adhesion promoter formulation, comprising one or more modified polyolefins according to claim 1.

14. The moulding material according to claim 13, in the form of a hotmelt adhesive formulation.

15. The moulding material according to claim 13, further comprising at least one selected from the group of additives consisting of a crosslinking accelerant, an inorganic and/or organic filler, an inorganic and/or organic pigment, a synthetic and/or natural resin, an inorganic and/or organic, synthetic and/or natural polymer, an inorganic and/or organic, synthetic and/or natural fibre, an inorganic and/or organic stabilizer, an inorganic and/or organic flame retardant, a resin, an amorphous poly($\alpha$-olefin), a polymer with polar groups, a polymers comprising ethylene, butadiene, styrene and/or isoprene, an elastomeric polymer comprising ethylene, propylene, acrylonitrile, a diene and/or a cyclic diene, styrene, a wax, a synthetic or natural oil and a UV-active substance.

16. The moulding material according to claim 13, in the form of a sealing membrane further comprising at least one of a polymer different from the modified polyolefin, a filler or bitumen.

17. The moulding material according to claim 13, in the form of a primer and/or adhesive promoter formulation applied to polyolefin surface.

18. An adhesive bond comprising one or more modified polyolefins according to claim 1.

19. The adhesive bond according to claim 18, wherein the adhesive bond is a packaging bond, a bond of hygiene articles, a wood adhesive bond, a bond of glass surfaces, a label bond, a lamination bond, a carpet or synthetic turf bond, a shoe bond, a pressure-sensitive bond, a book bond or a textile bond.

20. A dispersion, suspension and/or emulsion, comprising one or more modified polyolefins according to claim 1, wherein a proportion of the modified polyolefin is more than 10% by mass, based on the overall formulation.

21. The modified polyolefin according to claim 1, wherein the monomer grafted onto the unfunctionalized polyolefin comprises a vinyl silane.

22. A modified polyolefin, obtained by functionalization of a unfunctionalized polyolefin which is obtained by polymerizing a monomer composition, comprising:
from 7 to 16% by mass of 1-butene, from 3 to 8% by mass of ethylene, and from 78 to 83% by mass of propylene;
a sum of the proportions is 100% by mass,
a triad distribution for the propylene in the unfunctionalized polyolefin comprises:
32-90% by mass of a syndiotactic triad,
not more than 25% by mass of an isotactic triad, and
not more than 65% by mass of an atactic triad, and/or
a triad distribution for the 1-butene in the unfunctionalized polyolefin comprises:
not more than 96% by mass of a syndiotactic triad, and
not more than 45% by mass of a isotactic triad,
the triad content is determined by $^{13}$C NMR,
the sum of isotactic, syndiotactic and atactic triads of propene and 1-butene each add up to 100%, the unfunctionalized polyolefin is obtained by polymerization with a metallocene catalyst, and functionalizing the unfunctionalized polyolefin comprises grafting one or more monomers having one or more functional groups onto the unfunctionalized polyolefin.

23. A modified polyolefin, obtained by functionalization of a unfunctionalized polyolefin which is obtained by polymerizing a monomer composition, comprising:

ethylene in a proportion of not more than 20% by mass;

propylene in a proportion of not more than 15% by mass; and 1-butene in a proportion of 87-98% by mass;

wherein a sum of the proportions is 100% by mass, a triad distribution for the 1-butene in the unfunctionalized polyolefin comprises:

not more than 96% by mass of a syndiotactic triad, and not more than 45% by mass of a isotactic triad, the triad content is determined by $^{13}C$ NMR, the sum of isotactic, syndiotactic and atactic triads of propene and 1-butene each add up to 100%, the unfunctionalized polyolefin is obtained by polymerization with a metallocene catalyst, and functionalizing the unfunctionalized polyolefin comprises grafting one or more monomers having one or more functional groups onto the unfunctionalized polyolefin.

* * * * *